US012541027B2

(12) United States Patent
Unger et al.

(10) Patent No.: US 12,541,027 B2
(45) Date of Patent: Feb. 3, 2026

(54) LIDAR SIMULATION SYSTEM

(71) Applicant: Aurora Operations, Inc., Mountain View, CA (US)

(72) Inventors: Carl Jonas Magnus Unger, San Francisco, CA (US); Carl Magnus Wrenninge, San Francisco, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 978 days.

(21) Appl. No.: 17/476,784

(22) Filed: Sep. 16, 2021

(65) Prior Publication Data

US 2023/0080540 A1    Mar. 16, 2023

(51) Int. Cl.
*G01S 17/931* (2020.01)
*G01S 7/497* (2006.01)
*G01S 17/08* (2006.01)
*G06F 30/27* (2020.01)

(52) U.S. Cl.
CPC .......... *G01S 17/931* (2020.01); *G01S 7/497* (2013.01); *G01S 17/08* (2013.01); *G06F 30/27* (2020.01)

(58) Field of Classification Search
CPC ........ G01S 17/931; G01S 7/497; G01S 17/08; G06F 30/27
USPC .......................................................... 703/6
See application file for complete search history.

(56) References Cited

U.S. PATENT DOCUMENTS

| 5,241,315 A | 8/1993 | Spinhire |
| 2004/0239912 A1 | 12/2004 | Correia Da Silva Vilar et al. |
| 2017/0213149 A1 | 7/2017 | Micks |
| 2019/0025431 A1* | 1/2019 | Satyan ...................... G02F 1/21 |
| 2019/0057539 A1 | 2/2019 | Stanard |
| 2019/0369256 A1 | 12/2019 | Shotan et al. |

(Continued)

FOREIGN PATENT DOCUMENTS

| CN | 101131430 A | 2/2008 |
| CN | 102279391 A | 12/2011 |
| CN | 104049259 A | 9/2014 |

(Continued)

OTHER PUBLICATIONS

Egan_2011 (Practical Filtering for Efficient Ray-Traced Directional Occlusion, University of California San Diego, Sep. 27, 2011). (Year: 2011).*

(Continued)

*Primary Examiner* — Brian S Cook
(74) *Attorney, Agent, or Firm* — Patent Law Works LLP

(57) ABSTRACT

Simulating data received by a detection and ranging sensor including determining a first set of sample points on a surface of a simulated detector, the first set of sample points including a first sample point at a first location on the detector and a second sample point at a second location on the detector, generating a first ray associated with the first sample point, the first ray representing electromagnetic radiation reflected at a first point of intersection within a scene and incident on the first sample point on the surface of the detector; generating a second ray associated with the second sample point; the second ray representing electromagnetic radiation reflected at a second point of intersection within the scene and incident on the second sample point on the surface of the detector; and generating a ray-based data representation based on the first ray and the second ray.

20 Claims, 17 Drawing Sheets

(56) References Cited

U.S. PATENT DOCUMENTS

2020/0284883 A1\* 9/2020 Ferreira ............... G01S 7/4815
2022/0366640 A1\* 11/2022 Lasram .................... G06T 5/50

FOREIGN PATENT DOCUMENTS

| | | |
|---|---|---|
| CN | 106443708 A | 2/2017 |
| CN | 111624581 A | 9/2020 |
| KR | 101572618 | 12/2015 |
| KR | 1020210088692 | 7/2021 |
| WO | 2021004626 A1 | 1/2021 |

OTHER PUBLICATIONS

International Preliminary Report on Patentability issued for PCT/US2022/037707, mailed Mar. 28, 2024.
International Search Report and Written Opinion for PCT/US2022/037707, mailed Nov. 10, 2022, 9 pgs.
Gardner, I. C., "Validity of the Cosing-Fourth-Power Law of Illumination", Journal of Research of the National Bureau of Standards, vol. 39, Sep. 1947, 7 pgs.

\* cited by examiner

1300

Determine a first set of sample points on a surface of a simulated detector, the first set of sample points including a first sample point at a first location on the simulated detector and a second sample point at a second location on the simulated detector
1305

Generate a first ray associated with the first sample point, the first ray representing electromagnetic radiation reflected at a first point of intersection within a scene and incident on the first sample point on the surface of the simulated detector
1310

Generate a second ray associated with the second sample point; the second ray representing electromagnetic radiation reflected at a second point of intersection within the scene and incident on the second sample point on the surface of the simulated detector
1315

Generate a ray-based data representation based on the first ray and the second ray
1320

FIG. 13

LIDAR SIMULATION SYSTEM

BACKGROUND

An autonomous vehicle is trained to process information about the autonomous vehicle's surroundings and determine an appropriate trajectory through its environment. Information about the autonomous vehicle's environment may include data generated by a detection and ranging system. Different detection and ranging systems may use different portions of the electromagnetic spectrum. For example, radio detection and ranging ("RADAR") systems use radio waves and light detection and ranging ("LIDAR") systems use light. As there are a wide variety of driving circumstances that may be encountered, training machine learning models to safely and reliably navigate and control autonomous vehicle uses large quantities of training data to represent the wide variety of circumstances the autonomous vehicle may encounter as it navigates the environment. Some approaches may use simulation to generate the training data for training the machine learning models. However, the ability of the machine learning models trained using simulations to navigate and control the autonomous vehicle safely and reliably under a wide variety of circumstances may depend on how accurately the simulations, and the data used therein, approximate experiences in the real-world.

SUMMARY

This specification relates to methods and systems for simulating data received by a detection and ranging sensor. According to one aspect of the subject matter described in this disclosure, a method of simulating data received by a detection and ranging sensor includes determining a first set of sample points on a surface of a simulated detector, the first set of sample points including a first sample point at a first location on the simulated detector and a second sample point at a second location on the simulated detector; generating a first beam associated with the first sample point, the first beam representing electromagnetic radiation reflected at a first point of intersection within a scene and incident on the first sample point on the surface of the simulated detector; generating a second beam associated with the second sample point; the second beam representing electromagnetic radiation reflected at a second point of intersection within the scene and incident on the second sample point on the surface of the simulated detector; and generating a beam-based data representation based on the first beam and the second beam.

Other implementations of one or more of these aspects include corresponding systems, apparatus, and computer programs, configured to perform the actions of the methods, encoded on computer storage devices.

These and other implementations may each optionally include one or more of the following features. For instance, generating the beam-based data representation may include evaluating a first irradiance associated with the first sample point; evaluating a second irradiance associated with the second sample point; and generating a plot representing the surface of the simulated detector including the first irradiance at the first location and the second irradiance at the second location. Evaluating an irradiance associated with a sample point may include one or more of: evaluating an effect of a material at a point of intersection in the scene; evaluating an effect of a misalignment between a source and the simulated detector; evaluating an effect of a scan speed efficiency; and evaluating an effect of lens optics. For instance, the first point of intersection may be at a first target surface within the scene, and the second point of intersection may be at a second surface within the scene, and generating the beam-based data representation may include evaluating a first irradiance associated with the first sample point; evaluating a second irradiance associated with the second sample point; and generating a plot representing the surface of the simulated detector including the first irradiance at the first location and a second irradiance at the second location, the plot further representing, based the first irradiance at the first location relative to the second irradiance at the second location, an edge between the first target surface and second target surface. Determining the first set of sample points on the surface of the simulated detector may include dividing the surface of the simulated detector into a plurality of pixels including a first pixel and a second pixel; and determining the first sample point by sampling the first pixel and determining the second sample point by sampling the second pixel. The scene may be a virtual scene simulating a real-world vehicle. The method may include training a machine learning model based on the beam-based data representation, the machine learning model automating a task of a vehicle. Generating the beam-based data representation may include projecting the first beam through a response filter across a range of distance values; projecting the second beam through the response filter across the range of distance values, wherein the beam-based data representation represents intensity across the range of distance values; and obtaining a maximum intensity across the range of distance values, the maximum intensity associated with a distance to a surface in the scene. Generating the beam-based data representation may include projecting the first beam through a response filter across a first plurality of range bins; projecting the second beam through the response filter across a second plurality of range bins, wherein a working range associated with the simulated detector is discretized into a third plurality of range bins, and wherein the third plurality of range bins includes the first plurality of range bins and the second plurality of range bins; and obtaining a maximum intensity range bin, the maximum intensity range bin associated with a range of distances and estimating a distance to a surface in the scene. The method may include converting the distance to the surface in the scene to a bin domain.

BRIEF DESCRIPTION OF THE DRAWINGS

These and other aspects and features of the present implementations should become apparent upon review of the following description of specific implementations in conjunction with the accompanying figures, wherein:

FIG. 13 is a flowchart illustrating another a method for generating a ray-based data representation in accordance with some implementations.

DETAILED DESCRIPTION

Overview

Figure 1:
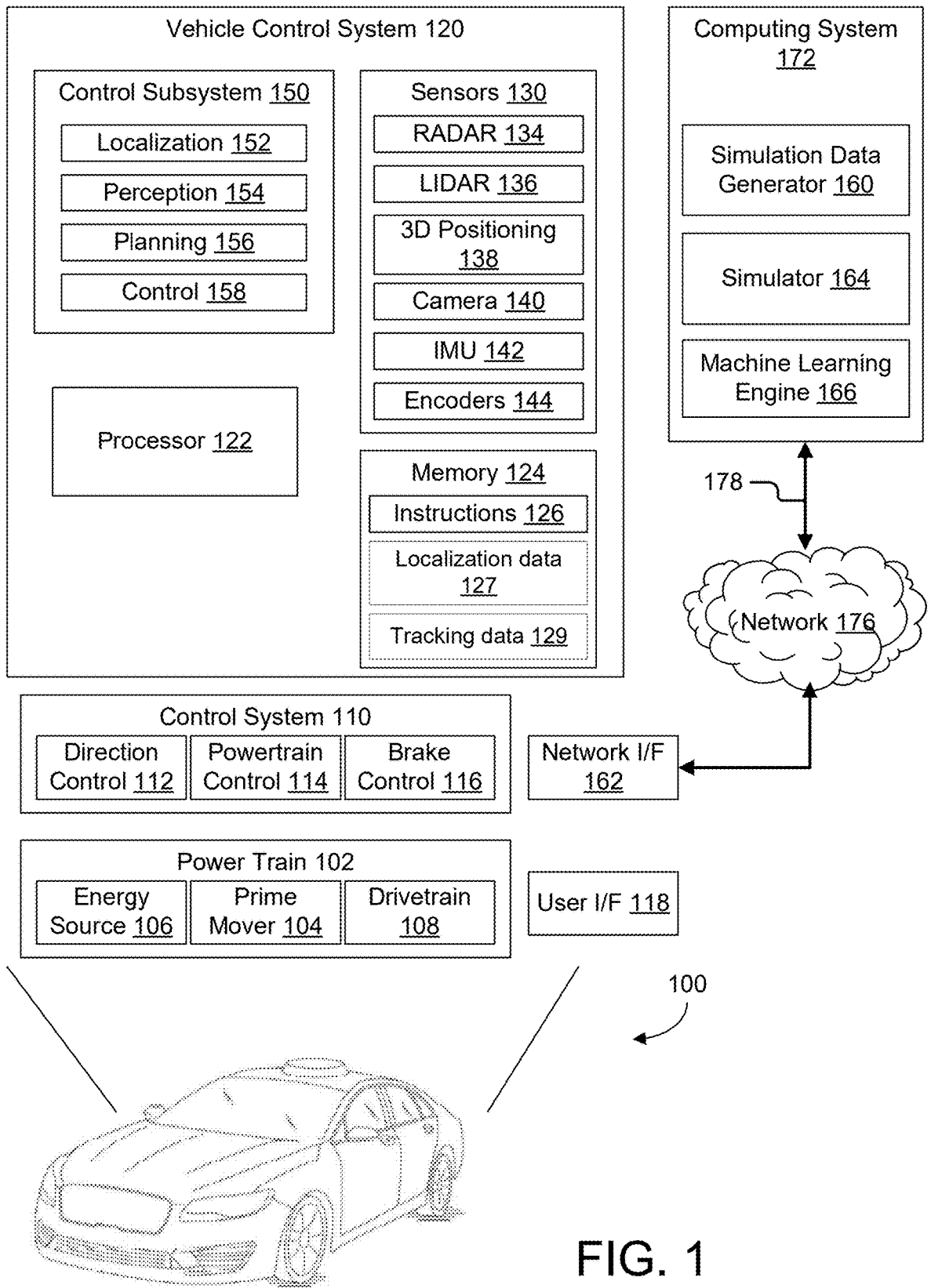
FIG. 1 is a block diagram illustrating an example of a hardware and software environment for an autonomous vehicle in accordance with some implementations.

In the following disclosure, a simulation data generator 160 is used to generate simulated sensor data associated with simulation scenarios, which may be used to train one or more machine learning models for autonomous control of an autonomous vehicle 100. The simulated sensor data may include simulated detection and ranging data, such as RADAR data or LIDAR data. For clarity and convenience, the below description refers to LIDAR implementations. However, it should be noted that the description herein may be adapted to radio waves and RADAR implementations without departing from the disclosure herein. Existing simulation systems suffer one or more deficiencies. For example, existing simulation systems may simulate LIDAR data as a close formed solution in which the laser spot received by the detector is simulated as a homogenous laser spot represented by a continuous equation regardless of the simulated scenario and surface(s) being scanned. A homogenous spot does not accurately simulate real-world LIDAR data received at a detector when, e.g., the beam is reflected off of multiple surfaces, reflected at different angles, or off of different materials. The systems and methods herein generate simulated LIDAR data that is pixelated, or has a speckle pattern to it, which better approximates real-world LIDAR data, e.g., captures reflections off of multiple surfaces, reflected at different angles, off different materials, etc.

Existing simulation systems may also fail to account for a number of factors that occur in the real-world when generating simulated LIDAR data. For example, existing simulation systems may fail to account for one or more of (a) the surface-light interaction of the surface off which the beam is reflected (e.g., based on material, surface finish or angle); (b) optics characteristics of the LIDAR sensor (e.g., pinhole, single lens, or compound lens); (c) a scan speed of the simulated sensor; (d) a misalignment of the LIDAR sensor (e.g., between the source and detector). By contrast, the systems and methods described herein may be used to generate simulated LIDAR sensor data that captures the effects of such factors and generates simulation data that more accurately approximates the LIDAR data captured in the real-world by a LIDAR sensor when experiencing the simulated scenario in the real-world.

The simulated LIDAR data may be used as training data to train machine learning models, which may be used in an autonomous vehicle for performing various autonomous vehicle tasks including perception, planning, and other tasks. An appropriate dataset of quality training data is needed to train the machine learning models. Waiting for training data to be gathered for autonomous vehicle tasks from the operation of vehicles in the real-world takes extended periods of time (e.g., weeks, months, etc.). Beyond the issue that real logged sensor data is limited, another particular issue with using real logged sensor data for training machine learning models is that it may include more noise than data from other sources like video game engines or video/film data. The simulation data generator 160 described herein generates training data for a variety of autonomous vehicle tasks using a set of simulation scenarios. For example, a simulation scenario may describe a three-dimensional scene (e.g., a virtual scene) that simulates the behavior, properties, and sensor configuration of the autonomous vehicle in specific encounters with the environment, including other vehicles (autonomous and/or non-autonomous) at rest or in motion, pedestrians, time of day, weather conditions, terrain, and road surface markings, among other things. The set of simulation scenarios may be used to generate thousands of variations for obtaining a sufficient quantity of training examples. The more accurately the LIDAR data generated from such simulations faithfully reproduces the LIDAR data that would be generated in the real-world, the more likely the machine learning models generated and used result in the autonomous vehicle behaving as desired and expected.

Therefore, the present disclosure is particularly advantageous because it provides a system and method for realistically simulating real-world LIDAR data.

Vehicle

Referring to the drawings, wherein like numbers denote like parts throughout the several views, FIG. 1 illustrates an example hardware and software environment for an autonomous vehicle 100 within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land and it should be appreciated that the aforementioned components 102-116 may vary widely based upon the type of vehicle within which these components are utilized.

For simplicity, the implementations discussed hereinafter focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in other implementations, multiple electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including, but not limited to, all-terrain or tracked vehicles, and construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 100. For example, sensors 130 can include one or more detection and ranging sensors (e.g., a RADAR sensor 134, a LIDAR sensor 136, or both), a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose" or "pose estimation") of the vehicle 100 within its surrounding environment, and generally within some frame of reference. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It should be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors of other types beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it should be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, different architectures, including various combinations of software, hardware, circuit logic, sensors, networks, etc. may be used to implement the various components illustrated in FIG. 1. Each processor may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid-state storage drive ("SSD"), network attached storage, a storage area network, and/or a tape drive, among others.

Furthermore, the vehicle 100 may include a user interface 118 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network and include a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 and signal line 178 with a computing system 172 for the purposes of implementing various functions described below for simulation and the generation of machine learning models. In some implementations, the computing system 172 is a cloud-based computing device. As described below in more detail, with reference to FIG. 2, the computing system 172 includes a simulation data generator 160 and a machine learning engine 166. In some implementations, not shown, the simulation data generator 160 may be configured and executed on a combination of the computing system 172 and the vehicle control system 120 of the vehicle 100. In other implementations, either the computing system 172 or the vehicle control system 120 of the vehicle 100 alone executes the functionality of the simulation data generator 160. The machine learning engine 166, operable on the computing system 172, generates a machine learning model based on the simulation scenario and simulated sensor data for use in autonomous control of the vehicle 100. The machine learning model may be sent from the computing system 172 to vehicle 100 to be used in the appropriate control subsystem 152-158 for use in performing its respective function. In alternate implementations, the simulation data generator 160 and the machine learning engine (not shown) operate on vehicle 100 to generate simulated data, generate a machine learning model based on the simulated data, and add the new machine learning model to the appropriate control subsystem 152-158 for use in performing its respective function.

Each processor illustrated in FIG. 1, as well as various additional controllers and subsystems disclosed herein, generally operates under the control of an operating system and executes or otherwise relies upon various computer software applications, components, programs, objects, modules, data structures, etc., as described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, are referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter are described in the context of fully functioning computers and systems, it should be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Simulation System

Figure 2:
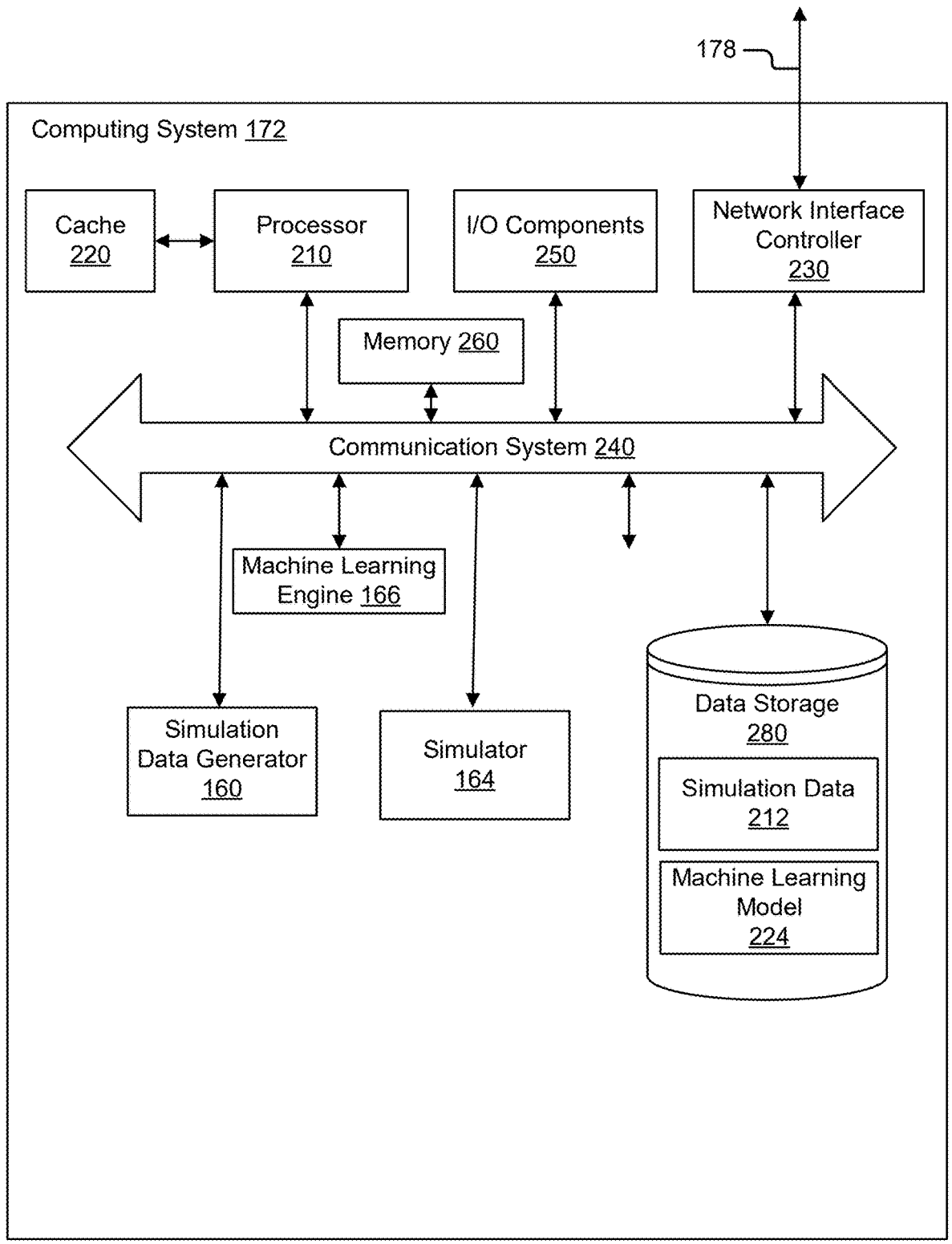
FIG. 2 is a block diagram illustrating an example computing system for generating and using simulated ranging and detection data in accordance with some implementations.

FIG. 2 is a block diagram illustrating an example of a computing system 172 for generating simulation data used in training a machine learning model in accordance with some implementations.

Referring to FIG. 2, the illustrated computing system 172 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated), a simulation data generator 160, a simulator 164, and a machine learning engine 166. Generally, the processor(s) 210 executes instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing system 172 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 260. While the simulation data generator 160 and the machine learning engine 166 are illustrated as being separate from processor 210 and memory 260, it should be appreciated that in some implementations, some or all of the functionality of the components 160 and 166 may be implemented with program code instructions resident in the memory 260 and executed by the processor 210.

The cache memory 220 is generally a form of computer memory placed in close proximity to the processor(s) 210 for fast read times. In some implementations, the cache memory 220 is part of, or on the same chip as, the processor (s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processors 210. In some implementations, the network interface controller 230 is part of a processor 210. In some implementations, a computing system 172 has multiple network interfaces controlled by a single controller 230. In some implementations, a computing system 172 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. Generally, a computing system 172 exchanges data with other computing devices via physical or wireless links (represented by signal line 178) through a network interface. The network interface may link directly to another device or to another device via an intermediary device, e.g., a network device such as a hub, a bridge, a switch, or a router, connecting the computing system 172 to a data network such as the Internet.

The data storage 280 may be a non-transitory storage device that stores data for providing the functionality described herein. The data storage 280 may store, among other data, simulation data 212 and a machine learning model or representation 224, as is defined below.

The computing system 172 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing system 172 includes an additional device such as a co-processor, e.g., a math co-processor can assist the processor 210 with high precision or complex calculations.

In implementations consistent with the disclosure, the computing system 172 may be utilized to train and/or validate the control subsystem 150 of the autonomous vehicle 100. More specifically, the present disclosure describes creation of simulated detection and ranging data, such as simulated LIDAR data, by the simulation data generator 160. Simulated LIDAR data may simulate LIDAR data received and logged by the LIDAR 136 sensor in the real-world when the autonomous vehicle 100 encounters a real-world scenario analogous to the scenario simulated by the simulator 164. Simulated scenarios, and associated simulated sensor data, may be used, by the machine learning engine 166, in training the machine learning models 224 for performing various autonomous vehicle tasks. As described below, in some implementations, the simulated detection and ranging data includes data based on generating beams or rays representing electromagnetic radiation reflected by the target surface and incident on sample points of the simulated detector and, therefore, includes a beam-based or ray-based representation of simulated detection and ranging data. It should be understood that throughout this application the terms "beam" and "ray" are used interchangeably to the mean the same thing. Likewise, the terms "beam-based" and "ray-based" are used interchangeably to the mean the same thing.

In some implementations, the computing system 172 includes a simulation data generator 160, a simulator 164, and a machine learning engine 166. The simulation data generator 160, simulator 164, and machine learning engine 166 of the computing system 172 are example components in which the techniques described herein may be implemented and/or with which systems, components, and techniques described herein may interface. While described in the context of the computing system 172, it should be understood that the operations performed by one or more components, e.g., 210, 220, 260, 240, 160, 164, 166, and 280, of FIG. 2 may be distributed across multiple computing systems. In some implementations, one or more aspects of components of computing system 172 may be combined into a single system and/or one or more aspects may be implemented by the computing system 172. For example, in some implementations, aspects of the simulation data generator 160 may be combined with aspects of the simulator 164. Engines in accordance with many implementations may each be implemented in one or more computing devices that communicate, for example, through the communication network 176.

The simulator 164 may generate and execute simulations of real-world driving situations, also referred to herein as scenes or scenarios, to generate simulation data 212. In some implementations, the simulator 164 may receive simulated sensor data generated and stored (e.g., within the simulation data 212) by the simulation data generator 160. For example, simulated sensor data may include simulated detection and ranging data, such as simulated LIDAR data, generated by the simulation data generator 160 to simulate what an analogous, real-world LIDAR sensor 136 would capture when presented with a real-world scenario analogous to the virtual one provided by the simulator 164. As an example, in some implementations, the simulation data generator creates a log of LIDAR data representing what a simulated LIDAR sensor 136 of a simulated autonomous vehicle 100 would generate as the vehicle navigates a simulated scenario and stores it within the simulation data 212.

The machine learning engine 166 may train the machine learning model 224 using simulation scenarios as training examples. In one implementation, the machine learning model 224 is a neural network model and includes a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally, or alternatively, the machine learning model 224 can represent a variety of machine learning techniques in addition to neural networks, for example, support vector machines, decision trees, Bayesian networks, random decision forests, k-nearest neighbors, linear regression, least squares, other machine learning techniques, and/or combinations of machine learning techniques.

Machine learning models 224 may be trained for a variety of autonomous vehicle tasks including determining a target autonomous vehicle location, generating one or more signals to control an autonomous vehicle, tracking or identifying objects within the environment of an autonomous vehicle, etc. For example, a neural network model may be trained to identify traffic lights in the environment with the autonomous vehicle 100. As a further example, a neural network model may be trained to predict the make and model of other vehicles in the environment with the autonomous vehicle 100. In many implementations, neural network models may be trained to perform a single task. In other implementations, neural network models may be trained to perform multiple tasks.

The machine learning engine 166 may generate training instances from the simulation scenarios to train the machine learning model 224. A training instance may include, for example, an instance of simulated autonomous vehicle data where the autonomous vehicle 100 can detect a stop sign using the simulated sensor data from one or more sensors and a label corresponding to a simulated output corresponding to bringing the autonomous vehicle to a stop in the simulation scenario. The machine learning engine 166 may apply a training instance as input to machine learning model 224. In some implementations, the machine learning model 224 may be trained using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. For example, the machine learning engine 166 may generate a predicted machine learning model output by applying training input to the machine learning model 224. Additionally, or alternatively, the machine learning engine 166 may compare the predicted machine learning model output with a machine learning model known output (e.g., simulated output in the simulation scenario) from the training instance and, using the comparison, update one or more weights in the machine learning model 224. In some implementations, one or more weights may be updated by backpropagating the difference over the entire machine learning model 224.

The machine learning engine 166 may test a trained machine learning model in accordance with some implementations. The machine learning engine 166 may generate testing instances using a simulation scenario and the simulated autonomous vehicle in the simulation scenario performing the specific autonomous vehicle task for which the machine learning model 224 is trained. The machine learning engine 166 may apply a testing instance as input to the trained machine learning model 224. A predicted output generated by applying a testing instance to the trained machine learning model 224 may be compared with a known output for the testing instance (i.e., a simulated output observed in the simulation) to update an accuracy value (e.g., an accuracy percentage) for the machine learning model 224.

Simulation Data Generator 160

Figure 3A:
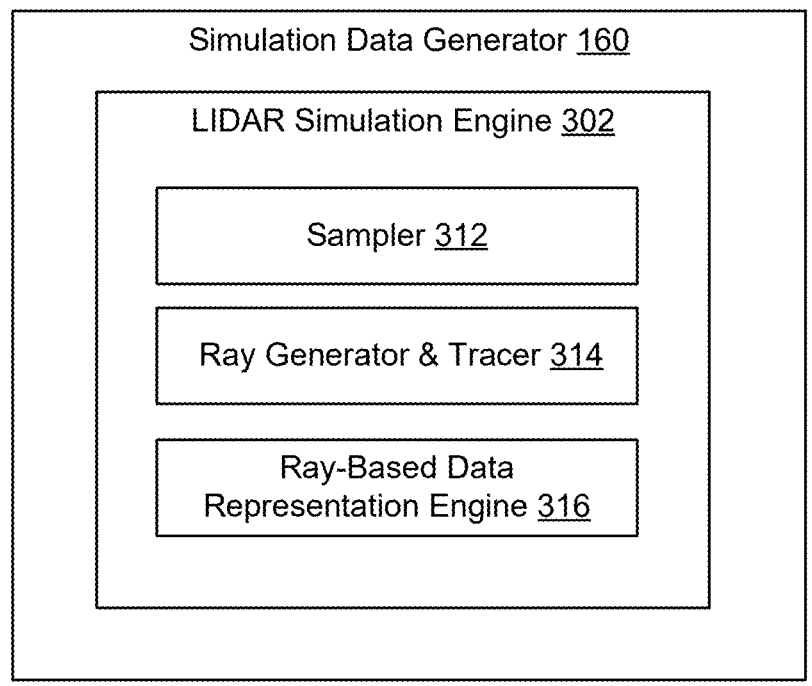
FIGS. 3A-C are block diagrams illustrating examples of a simulation data generator in accordance with some implementations.

Referring to FIG. 3A, a diagram of the simulation data generator 160 in accordance with some implementations is illustrated. In the illustrated implementation, the simulation data generator 160 includes a LIDAR simulation engine 302 having: a sampler 312, a ray generator and tracer 314, and a ray-based data representation engine 316.

Figure 12:
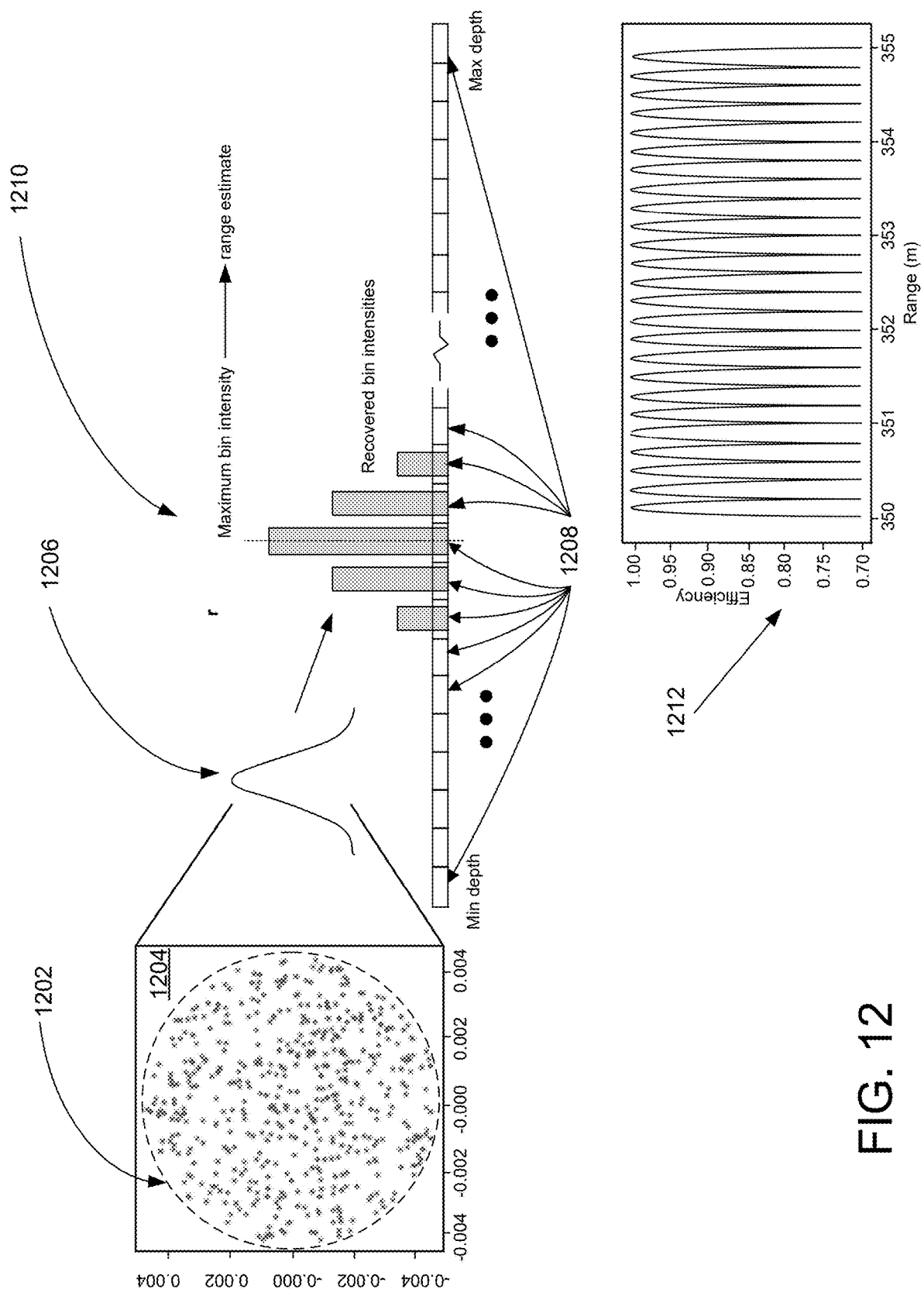
FIG. 12 is a diagram illustrating a method for generating another ray-based data representation in accordance with some implementations.

The sampler 312 generates a set of sample points on the simulated detector. In some implementations, the sampler 312 generates the set of sample points on the simulated detector by randomly sampling the simulated detector. For example, in one implementation, the sampler 312 applies a blue noise stratification sampling scheme to generate the set of sample points. However, it should be recognized that other statistical sampling schemes exist and may be applied by the sampler 312, and that another statistical sampling scheme may be applied without departing from the present disclosure. Depending on the implementation, the boundary within which the sampler 312 generates the set of samples may vary without departing from the present disclosure. For example, in one implementation, the random sampling applied by the sampler 312 may be applied across an entirety of the surface plane of a simulated detector, within a portion of the surface plane of the simulated detector (e.g., within a "pixel" of the detector), or within a particular boundary shape (e.g., an ellipse). Depending on the implementation, the sampler 312 may generate multiple, different sample sets. For example, in one implementation, the sampler 312 generates n sets of samples by sampling individual pixels of the simulated detector, as described below with reference to FIG. 3B and FIG. 5, and a set of samples within a circular disk centered on the plane of the simulated detector surface, as described below with reference to FIG. 3C and FIG. 12.

The ray generator and tracer 314 generates a ray from a sample point on the simulated detector to a point on a surface, occasionally referred to herein as a "target surface", that is within the simulated scene, which is intersected by the electromagnetic radiation emitted by a source of the simulated ranging and detection sensor. In some implementations, the ray, generated by the ray generator and tracer 314, represents electromagnetic radiation reflected by the target surface and incident on the sample point of the detector. For example, the ray generator and tracer 314 generates a ray that extends from a sample point on the detector to a point on a surface in the simulated scene illuminated by a laser of a simulated LIDAR sensor. The point of reflection and the local frame defined by the normal direction and tangent vectors at the target are identified by testing the sample ray for intersection at the surfaces in the scene.

The ray-based data representation engine 316 generates one or more ray-based data representations of simulated detection and ranging data. The ray-based data representations and intermediate data representations may vary based on the implementation and/or use case. In some implementations, the ray-based data representation engine 316 generates one or more ray-based data representations that simulate real-world LIDAR data. For example, the ray-based data representation engine 316 generates one or more of the ray-based data representations described below with reference to FIGS. 3B, 4-11, 13, and 14. In some implementations, the ray-based data representation engine 316 generates one or more ray-based data representations estimating a distance to a target. For example, the ray-based data representation engine 316 generates the one or more ray-based data representations described below with reference to FIG. 3C and FIGS. 12, 13, and 15. It should be understood that the examples described below are merely examples of ray-based data representations and that other implementations are within the scope of this disclosure.

Figure 3B:
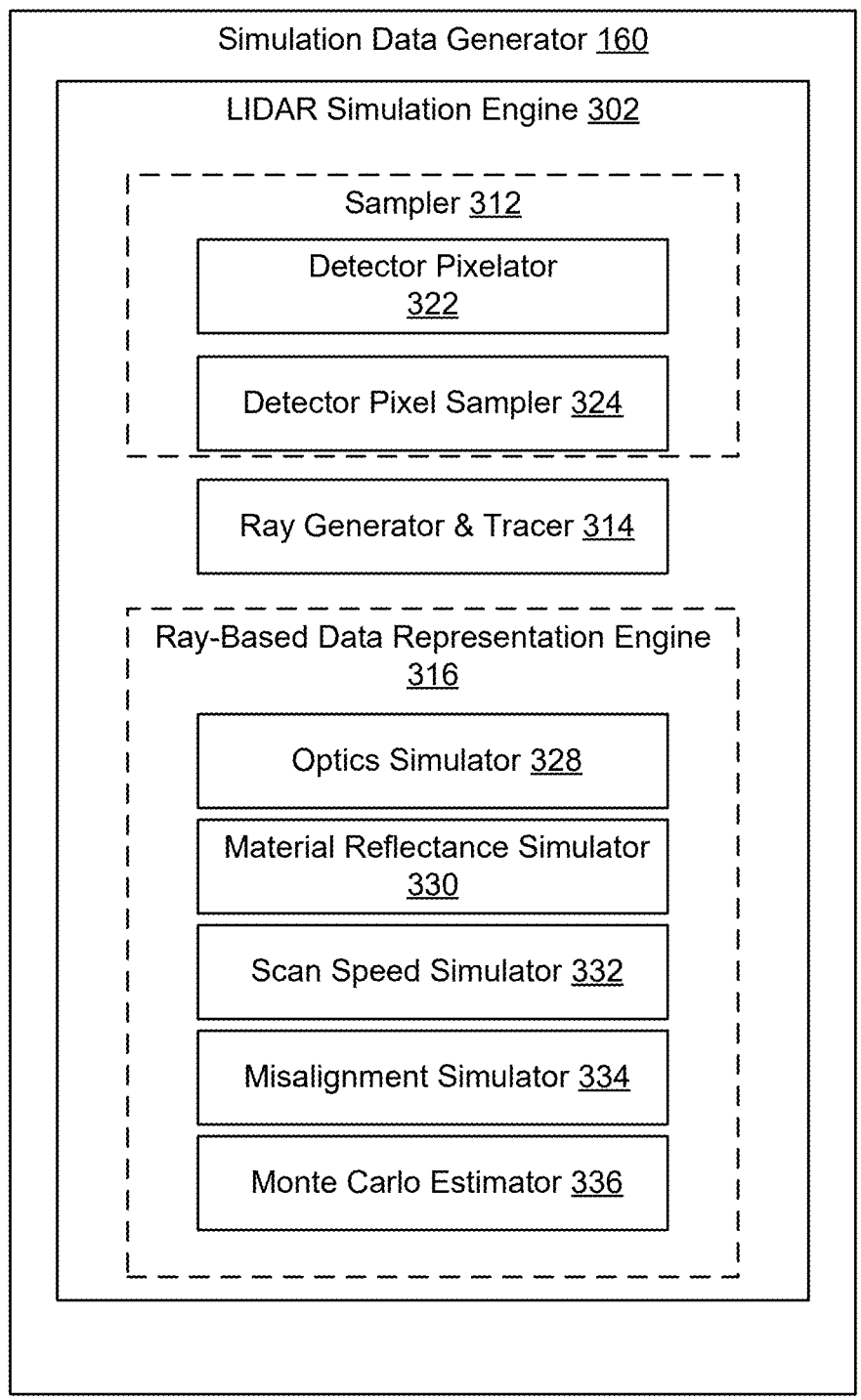

Referring to FIG. 3B, a diagram of the simulation data generator 160 in accordance with some implementations is illustrated. In the illustrated implementation, the simulation data generator 160 includes a LIDAR simulation engine 302. The LIDAR simulation engine 302 includes the sampler 312 having a detector pixelator 322 and a detector pixel sampler 324; the ray generator and tracer 314; and a ray-based data representation engine 316 having an optics simulator 328, a material reflectance simulator 330, a scan speed simulator 332, a misalignment simulator 334, and a Monte Carlo estimator 336.

Figure 4:
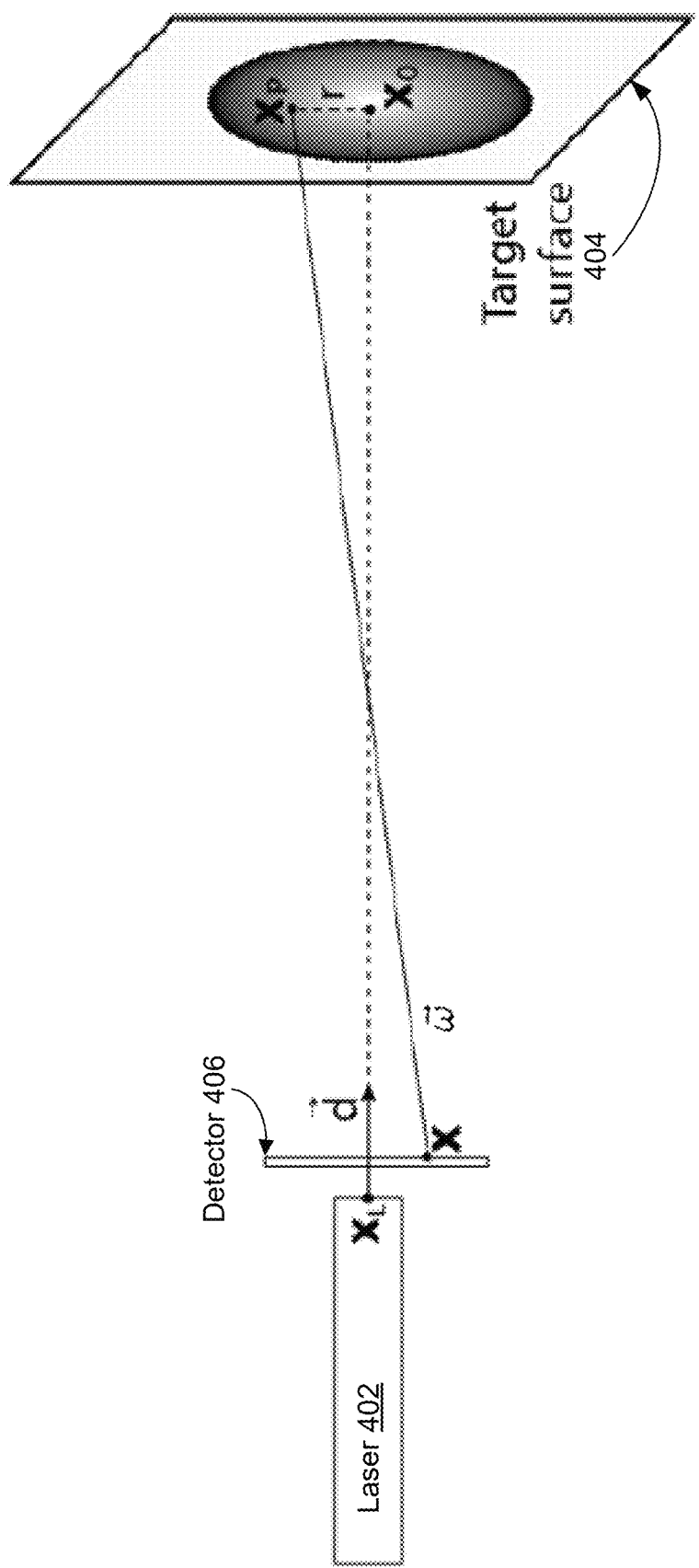
FIG. 4 is a diagram of LIDAR sensor components and a target in accordance with some implementations.

Referring now also to FIG. 4, a diagram illustrating a simplified example of a LIDAR sensor and its components operating on a target is provided for clarity and convenience in accordance with some implementations. As illustrated, a LIDAR sensor, in some implementations, may include a source, such as laser 402, and a detector 406. The source, e.g., the laser 402, emits electromagnetic radiation represented by vector d, which, in the case of LIDAR, is light in the form of a laser beam. The laser beam exits the laser 402 at an aperture indicated by point $X_L$, travels a distance (not labeled), intersects the target surface 404, reflects off of the target surface 404, and strikes the detector 406. As a laser beam travels, the beam radius grows, which is conceptually illustrated by the darkened area on the target surface 404 having a greater height than the aperture of the laser 402, which is illustrated as point $X_L$. While photons from the laser 402 may intersect the target surface 404 within the darkened area then reflect back to the sensor, for clarity and convenience, only a photon striking at point $X_p$ and reflecting to intersect the detector 406 at point X is illustrated in FIG. 4. Based on the photons detected by the detector 406, a distance to the target surface 404 may be determined.

The detector pixelator 322 pixelates a simulated detection and ranging detector, which may be referred to herein as a "detector" or similar. In some implementations, the detector pixelator 322 pixelates the detector by dividing the detector into a number of subsections, which may be referred to herein as "pixels." In one implementation, the detector pixelator 322 divides the sensor into N by M pixels. For example, assume that a real-world LIDAR sensor with a one (1) mm by one (1) mm detector is being simulated; in some implementations, the detector pixelator 322 divides the simulated detector into thirty-two (32) by thirty-two (32) subdivisions so the resulting 1024 pixels are 0.3125 mm by 0.3125 mm in size.

Figure 5:
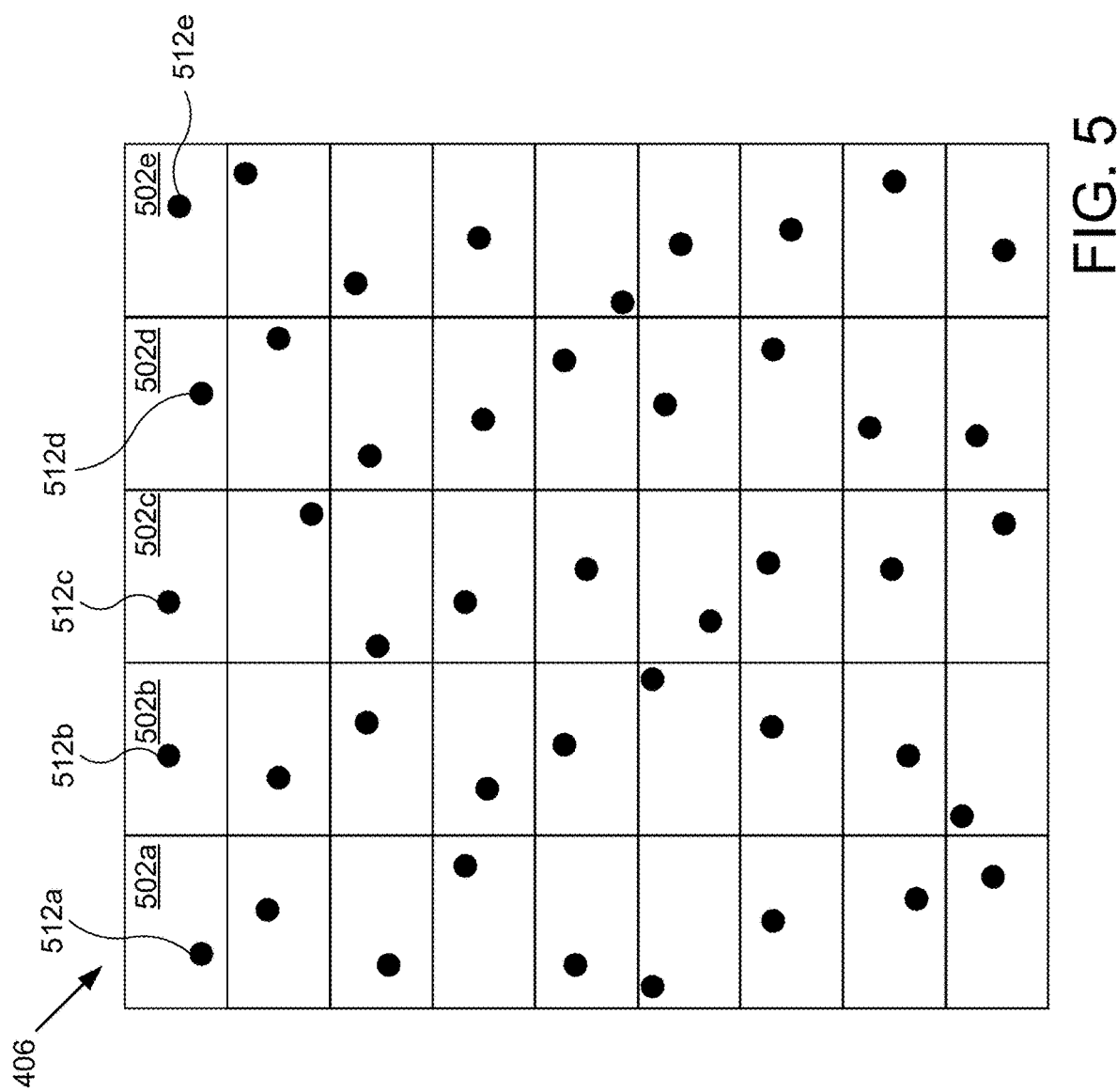
FIG. 5 is a diagram illustrating a pixelated and sampled sensor in accordance with some implementations.

Referring now also to FIG. 5, a diagram illustrating an example of a pixelated detector is illustrated in accordance with some implementations. In FIG. 5, the detector 406 is divided, by the detector pixelator 322, into forty-five (45) quadrilateral pixels, as illustrated by the grid of pixels arranged in five (5) columns and nine (9) rows. It should be recognized that the number of pixels and the shape of each pixel may vary from the examples described herein based on one or more factors including, but not limited to, a shape of the detector being simulated, a size of the detector being simulated, a real-world resolution of the detector being simulated, user input defining one or more of: a pixel, shape, size, number of pixels, subdivision of the detector, etc.

Referring back to FIG. 3, the detector pixel sampler 324 generates a set of sample points on the simulated detector. In some implementations, the detector pixel sampler 324 generates the set of sample points on the simulated detector by sampling each pixel determined by the detector pixelator 322 n times.

Depending on the implementation, the sampling scheme performed by the detector pixel sampler 324 may vary in the sampling schemes available (e.g., the statistical sampling schemes available for use) and the sampling scheme used (e.g., which sampling scheme is coded into the detector pixel sampler 324, selected by the user, or automatically selected by the detector pixel sampler 324 from multiple available sampling schemes). For example, referring again to FIG. 5, assume that the detector pixel sampler 324 has applied a blue noise stratification sampling scheme to create one sample point per pixel, which results in a set of sample points including sample point 512a in pixel 502a, sample point 512b in pixel 502b, sample point 512c in pixel 502c, and so on, as illustrated for each of the forty-five (45) illustrated pixels.

It should be recognized that the number of samples may vary from those in the examples herein based on the one or more factors including, but not limited to, a pixel size or density (e.g., if the pixels are relatively large and/or few, more samples per pixel may be may be generated), the computational resources of the computing system 172, user preference, optics characteristics of the LIDAR sensor, etc. For example, when the optics characteristics of the LIDAR sensor 136 simulated is pinhole, one point per pixel is sampled by the detector pixel sampler 324. In another example, the LIDAR sensor 136 being simulated uses a single lens or compound lens and more than one point is sampled from each pixel by the detector pixel sampler 324 to cover the angular domain, or the detector pixel sampler 324 samples the angular domain. Additionally, while the description above describes sampling pixels, in some implementations, the sampling may be performed across the surface of the detector without pixelating the detector and generating the samples on a per-pixel basis.

The ray generator and tracer 314 generates a ray and traces the ray from the sample point to a point of intersection within a scene. For example, in one implementation, the ray generator and tracer 326 receives (e.g., individually, on a per-pixel basis, or as a detector-wide batch) the set of sample points generated by the detector pixel sampler 324, or more generally the sampler 312, and generates a ray for each point within the set of sample points and traces each of those rays to the rays associated point of intersection within a scene (e.g., a scene simulating a traffic scene a vehicle 100 may encounter in the real world). For example, referring to FIG. 4, assume that laser 402, target surface 404, and detector 406 are simulated and that X represents a sample point on a simulated detector 406; in one implementation, the ray generator and tracer 314 generates a ray, $\vec{\omega}$, from point X that intersects the target surface 404, within the darkened area intersected by laser 402 incident on the target surface 404, at point $X_p$. In some implementations, the irradiance profile at the target surface 404, which is illustrated as the darkened spot, is modeled herein as a Gaussian laser spot.

It should be recognized that each ray may not necessarily intersect the same surface within the scene. For example, the modeled laser beam may intersect multiple surfaces which may be at different distances or be made of different materials. For example, a first ray may be traced from a first pixel to a first surface, which may be at the edge of a vehicle, and a second ray is traced from a second pixel to a second surface further away from the laser 402, which may belong to a pedestrian or some other object).

In some implementations, the ray-based data representation engine 316 uses the rays generated by the ray generator and tracer 314 to generate a first ray-based data representation that simulates real-world LIDAR data received at a detector, which may occasionally be referred to herein as "simulated LIDAR data" or similar.

Figure 9:
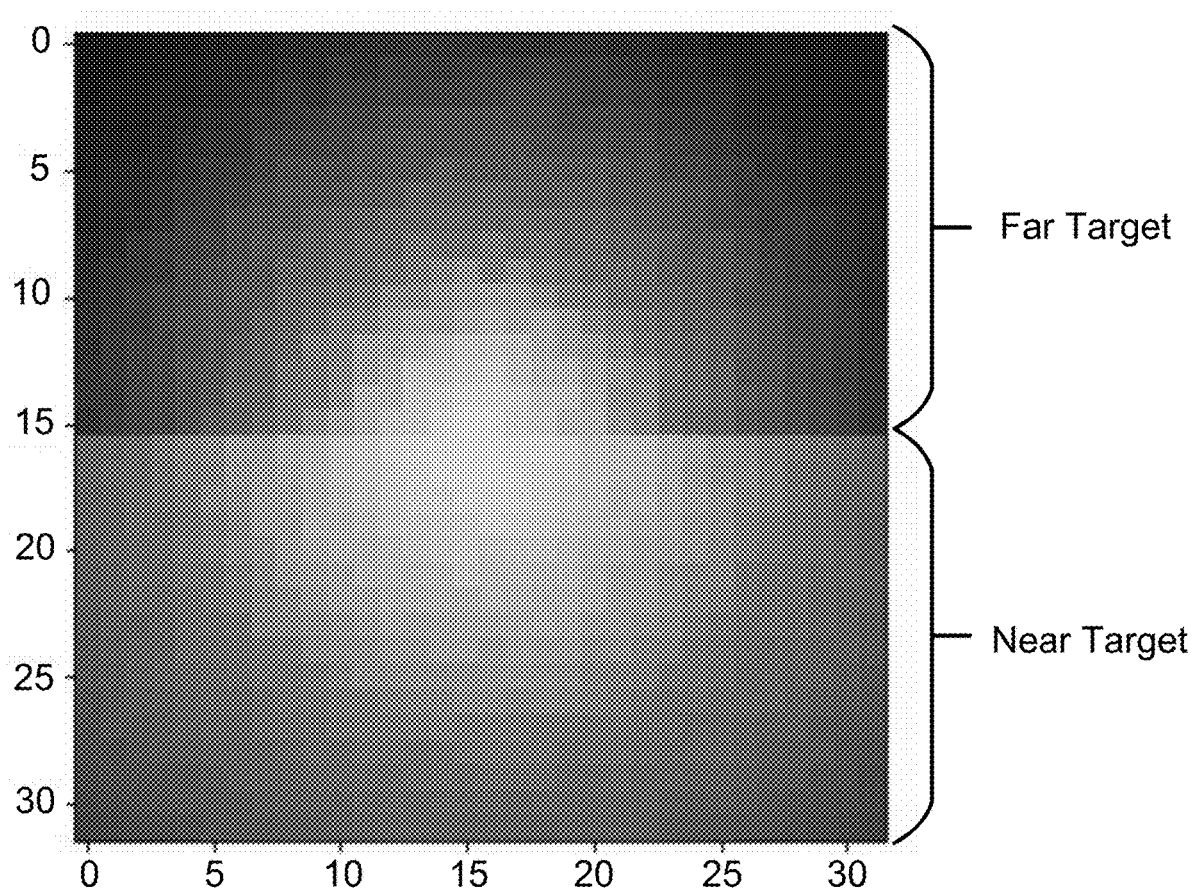
FIG. 9 is a diagram illustrating a ray-based data representation of multiple targets at different distances in accordance with some implementations.
Figure 10:
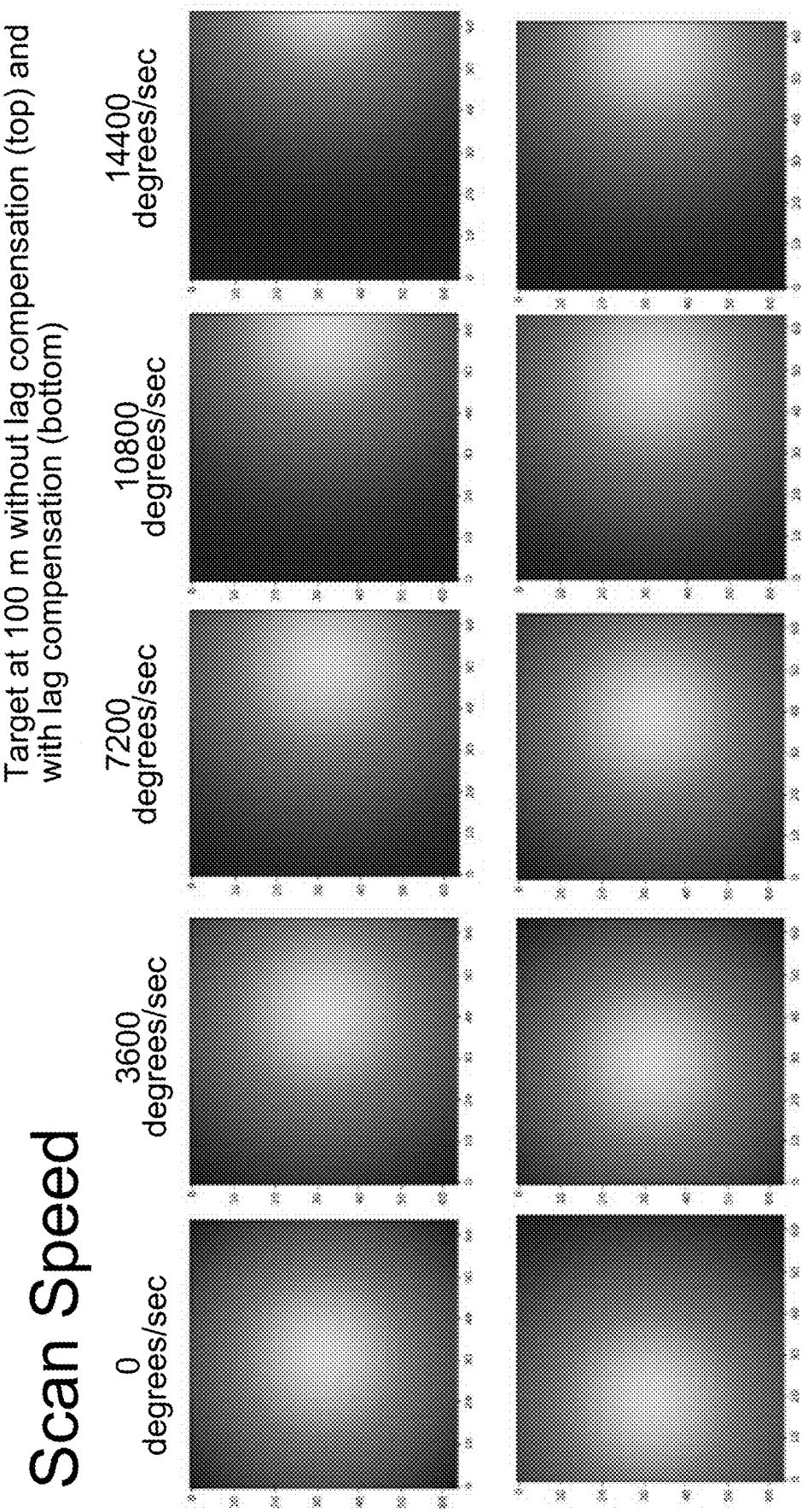
FIG. 10 is a diagram illustrating the effects of scan speed efficiency on a ray-based data representation in accordance with some implementations.

By sampling the detector 406 and individually tracing rays, the Monte Carlo estimator 336 may generate a first ray-based data representation, which more accurately represents real-world LIDAR data received when a LIDAR laser reflects off of multiple surfaces. For example, referring now to FIG. 9, a diagram illustrating a plot of simulated LIDAR data, where the simulated beam reflects off of multiple targets at different distances is provided in accordance with some implementations. In FIG. 9, the rays traced from samples on the lower portion of the detector were traced to a first target surface, which is nearer than a second target surface to which samples in the upper portion were traced. When the Monte Carlo estimator 336 generates the simulated LIDAR data and plots the simulated LIDAR data across an area representing the simulated detector, as shown, the reflectance is higher off of the near target surface (bottom) than the far target surface (top) as indicated by the relative brightness of the spot and a boundary between the two surfaces is captured in the simulated LIDAR data, i.e., a first ray-based data representation.

Figure 11:
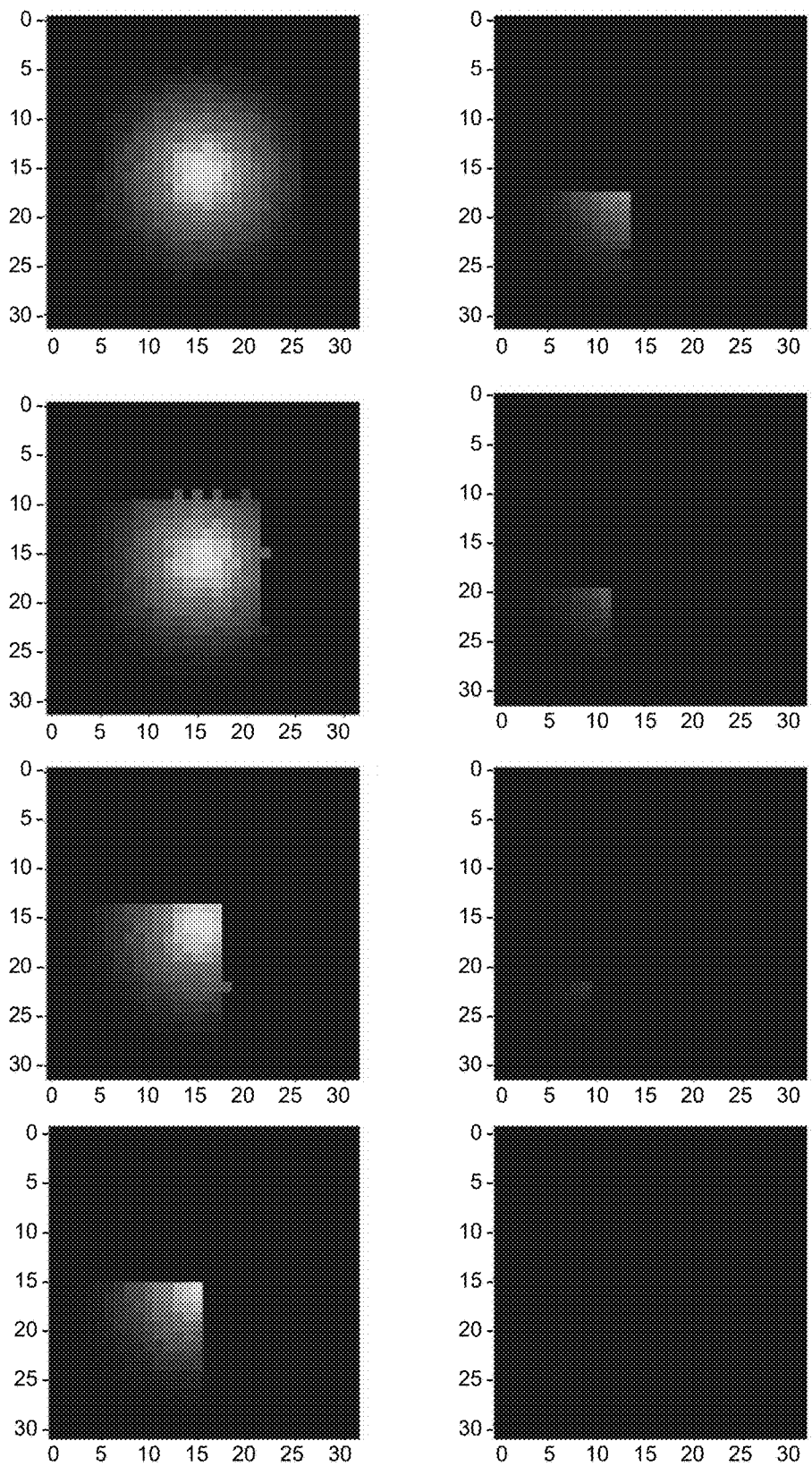
FIG. 11 is a diagram illustrating a series of example plots of simulated LIDAR data in which a target surface is translated in accordance with some implementations.

By sampling the detector 406 and individually tracing rays, the Monte Carlo estimator 336 may generate a first ray-based data representation that more accurately represents real-world LIDAR data received when a LIDAR laser reflects off an edge of a surface. Referring now to FIG. 11, a diagram illustrating a series of example plots of simulated LIDAR data generated as ray-based data representations from a simulation in which a target surface is translated down and to the left is illustrated in accordance with some implementations. When the images of FIG. 11 are analyzed top-to-bottom, then left-to-right, a progression of the beam hitting centering on the surface, then progressively moving to, and then past, a corner edge of the surface is apparent, and the boundary of the surface is evident. By contrast, existing systems, which model LIDAR data as a homogeneous spot represented by a continuous equation, do not capture the edges and the relative translation of the surface. Rather, the homogenous spot merely grows smaller and less bright as less light is reflected off of the increasingly smaller portion of the surface that intersects the beam. Therefore, the ray-based representation of simulated LIDAR data, generated by the Monte Carlo estimator 336, may more accurately simulate real-world LIDAR data, which represents edges and multiple target surface reflections, and may be used to train machine learning models.

In the implementation illustrated in FIG. 3B, the ray-based data representation engine 316 comprises the optics simulator 328, the material reflectance simulator 330, the scan speed simulator 332, the misalignment simulator 334, and the Monte Carlo estimator 336. However, other implementations may include other components or optionally omit one or more of the illustrated components. For example, an implementation may choose to ignore the effects associated with one or more of optic configuration, material reflectance, scan speed, and misalignment in a simulated LIDAR sensor and may omit one or more of the optics simulator 328, the material reflectance simulator 330, the scan speed simulator 332, and the misalignment simulator 334, respectively, without departing from the disclosure herein.

The optics simulator 328 receives optics characteristic data of the laser 402, detector 406, or both, which may be used by the Monte Carlo estimator 336 to more accurately simulate the real-world LIDAR data generated in an analogous real-world scene. Optical characteristics, by way of example and not limitation, may include one or more of an optics configuration (e.g., pinhole, lens configuration, which may include simple or compound), source characteristic (e.g., laser power or intensity, laser wavelength(s) of the laser 402), etc. In some implementations, the ray generator and tracer 326 may use the optics configuration to trace a ray generated by the ray generator and tracer 326.

The material reflectance simulator 330 simulates an effect of the target surface(s) the traced rays intersect. Different materials have different light-surface interaction characteristics, which may be referred to herein as reflection characteristics. The reflectance characteristics of a surface may vary based on, by way of example and not limitation, one or more of an angle of the target surface, the material of the target surface, a smoothness of the target surface, how much light penetrates the target surface, a color of the target surface, the wavelength of light used by the source, etc.

Figure 8:
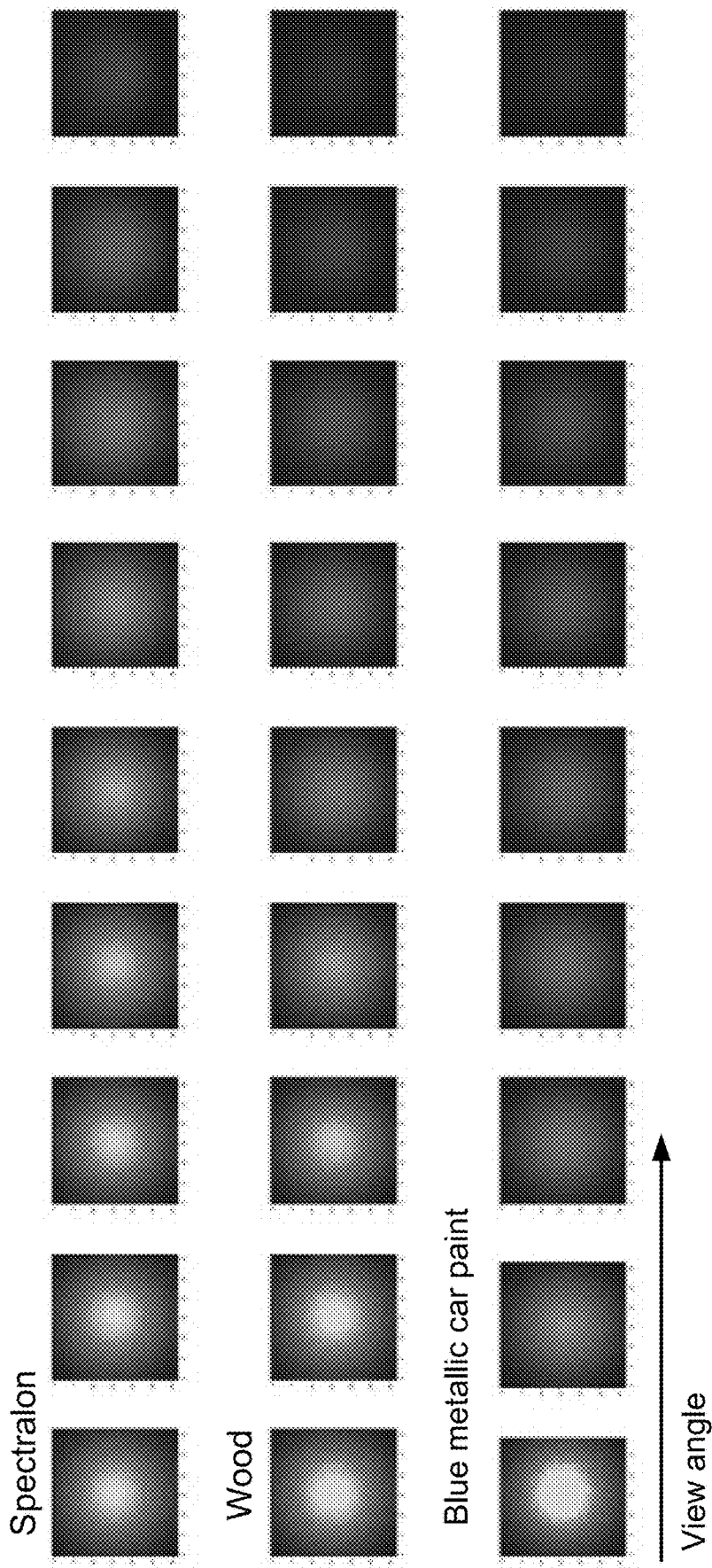
FIG. 8 is a diagram illustrating an effect of various example target materials and viewing angles in accordance with some implementations.

In some implementations, the material reflectance simulator 330 obtains reflectance characteristic information, which may be used by the Monte Carlo estimator 336. For example, in one implementation, the material reflectance simulator 3303 accesses a database of measured bi-directional reflectance distribution functions describing an effect of viewing angle and reflectance for various materials (e.g., various car paints, painted metals, concrete, brick, asphalt, wood, plants, rock, leaves, glass, clothes, etc.). In some implementations, the material reflectance simulator 330 advantageously uses bi-directional reflectance distribution functions at the surface. For example, the bi-directional reflectance distribution functions can be represented as a parametric model with parameters fitted from data or set by hand; or a data driven model in which the bi-directional reflectance distribution function is represented using the raw measured data or by first performing a projection onto some suitable basis. This may more accurately simulate expected real-world reflectance characteristics when a surface analogous to the simulated surface (e.g., car with blue metallic paint vs a car painted white) is encountered in the real-world. By obtaining reflectance characteristic information, the simulated LIDAR data, generated by the Monte Carlo estimator 336, may more accurately simulate LIDAR reflecting off of simulated surfaces, so that the LIDAR data may more accurately simulate the reflection off of objects, such as a pedestrian, wall, car, plant, at the angle(s) the object appears to the LIDAR sensor 136 in the simulation scenario. For example, referring now to FIG. 8, a diagram illustrating an effect of various example target materials and viewing angles in accordance with some implementations is provided. In FIG. 8, each row of images is associated with a material. The left-most image in each row is the reflectance with a viewing angle normal to the surface, and the images moving from left-to-right show how the reflectance changes for the respective material as the viewing angle increasingly deviates from being normal to the surface. As illustrated, the "Spectralon" does not have as high of reflectance as "Blue metallic car paint" when the viewing angle is 0 (dead-on or normal to the surface), as indicated by the size and relative brightness of the spot, while the reflectance of "Spectralon" is greater at increased viewing angles relative to "Blue metallic car paint."

The scan speed simulator 332 receives information regarding a scan speed of the LIDAR sensor 136. As mentioned above, FIG. 4 is a simplified implementation of LIDAR. In some applications of LIDAR, the LIDAR sensor 136, or components thereof, may rotate. For example, the LIDAR sensor 136 may rotate 360 degrees to detect and range objects surrounding the vehicle 100. While light travels quickly, it is not capable of instantaneous travel. Therefore, there is some lag time between when light is emitted from the laser 402 and received by the detector 406, and the lag increases with the distance the light must travel from the laser 402, to the target surface 404, and then to the detector 406. By the time the light (photon) is received at a rotating detector 406, the detector 406 may have rotated from the alignment at the time the light was emitted from the laser 402. The faster the LIDAR sensor 136 rotates (e.g., the higher the scan speed); the more the detector may have moved out of alignment during the lag time. For example, referring to the images in the top row of FIG. 10, the bright spot occurs further and further to the right of the image as the scan speed increase from 0 degrees-per-second (left most image in first row) to 14400 degrees-per-second (right most image in first row). In some implementations, the scan speed simulator 332, simulates such effects of scan speed, for example, by performing a translation on the simulated LIDAR data.

In some implementations, the scan speed simulator 332 may also simulate lag compensation. For example, referring again to FIG. 10, comparing the images in the second, or bottom, row to the corresponding images above, the bright spots is shifted to the left in the image in the bottom row, when compared to the corresponding image in the top row.

The misalignment simulator 334 receives information regarding a misalignment of the source and detector. Referring again to FIG. 4 the laser 402 and the detector 406 are aligned. However, in the real-world, a source 402 and a detector 406 may not be aligned as is illustrated. The misalignment simulator receives misalignment information, which may be incorporated in the simulated LIDAR data by the Monte Carlo estimator 336, e.g., by adding a term to one or more of the calculations performed by the Monte Carlo estimator 336.

The Monte Carlo estimator 336 generates a first ray-based data representation that simulates real-world LIDAR data. To compute a radiant flux, ¢, [W-J/s] incident on the detector 406, the irradiance, E, [W/m2] incident at each location, X, on the photo-sensitive surface area, S, of the detector 406:

$$\Phi(x,t) = \int_S E(x,t) da(x) \qquad \text{Equation 1}$$

The irradiance, E, describes the radiant flux per unit area at location X on the photodetector, and is computed by the integrating the radiance, L, [W/(sr·m²)], incident at X. The irradiance observed at a sample point on the virtual receiver plane, I, can be described in terms of the scene radiance as:

$$E(x,t) = K \cdot L(x, \vec{\omega}, t) \qquad \text{Equation 2}$$

where K approximates effects from the optics, d is the direction from the sample point on the sensor towards the point from which radiance is arriving. In computer vision/graphics/imaging it is common to model the optical system as $$K = \frac{\pi}{4}\left(\frac{d_a}{f}\right)^2 \cos\cos(\alpha)^4,$$

known as the "cosine-fourth-power law", where da is the diameter of the aperture, f is the distance from the pinhole/lens to the sensor, and α is the angle between the solid angle direction $\vec{\omega}$ and the optical axis. Having established the relationship between the observed irradiance, E, on the virtual sensing plane and the scene radiance, L, the radiant power at each virtual pixel, $I_m$, can be described as:

$$\Phi(x, t) = K \int_S L(x, \vec{\omega}, t) h(a) da(x), \Phi \qquad \text{Equation 3}$$

where h(a) is a reconstruction filter.

To generate the pixelated, or speckle-patterned, simulated LIDAR data, as illustrated in FIGS. 8, 9, and 11, the Monte Carlo estimator 336 solves:

$$F_N = \frac{1}{n}\sum_i \frac{f(X_i)}{p(X_i)} \qquad \text{Equation 4}$$

where $X_i$ is a set of random sample points of cardinality n drawn from the probability density function $p(X_i)$.

The Monte Carlo estimator 336 estimates the radiant flux, Φ, from Equation 1, above, incident on the detector 406 using the n samples in each of the pixels generated by the detector pixel sampler 324. In one implementation, for each sample point, two random numbers $\xi=(\xi_0, \xi_1)$ uniformly distributed over the interval [0,1] are drawn and multiplied with the dimensions of a pixel (e.g., a width, $\Delta x$, and height, $\Delta y$), and offset by the location by a pixel location, $x_{j_o}$, to yield:

$$x_i = (\lambda_0 \Delta x, \xi_1 \Delta y) + x_{j_o} \qquad \text{Equation 5}$$

Accordingly, the joint probability density function of Equation 4 becomes:

$$p(x) = \frac{1}{\Delta x \Delta y}, \qquad \text{Equation 6}$$

and Equation 4 becomes:

$$\Phi_{n_j} = \frac{\Delta x \Delta y}{n}\sum_i E(x_i, t) f(x_i, t) \qquad \text{Equation 7}$$

where $x_i$ is the set of sample points. For the pinhole case, a single ray per pixel and/or sample point is used and Equation 2 is evaluated at the n sample points. For more complex cases, e.g., describing a single lens or compound lens optics, a larger set of directions may be sampled for each pixel to cover the angular domain $\Omega_x$, which may be done by the detector pixel sampler 324 increasing the number of sample points per pixel (each using a single angular sample) or by the detector pixel sampler 324 sampling the $\Omega_x$ using:

$$\int_\Omega L(X_p, \vec{\omega}_i, t) \rho(X_p, \vec{\omega}_i, \vec{\omega}_o) \cos\theta d\sigma(\vec{\omega}_i) \qquad \text{Equation 8}$$

When the above is performed by the Monte Carlo estimator 336, a flux and irradiance are determined on a pixel-by-pixel, or sample-by-sample, basis for the simulated detector. Accordingly, the Monte Carlo estimator 336 generates the simulated LIDAR data, examples of which are illustrated in FIGS. 9 and 11. The LIDAR simulation engine 302 may execute repeatedly. For example, to generate successive, simulated LIDAR data, such as the examples illustrated in FIG. 11, which may be used to train (with or without real-world LIDAR data depending on the implementation) a machine learning model to automate a task for an autonomous vehicle.

Figure 3C:
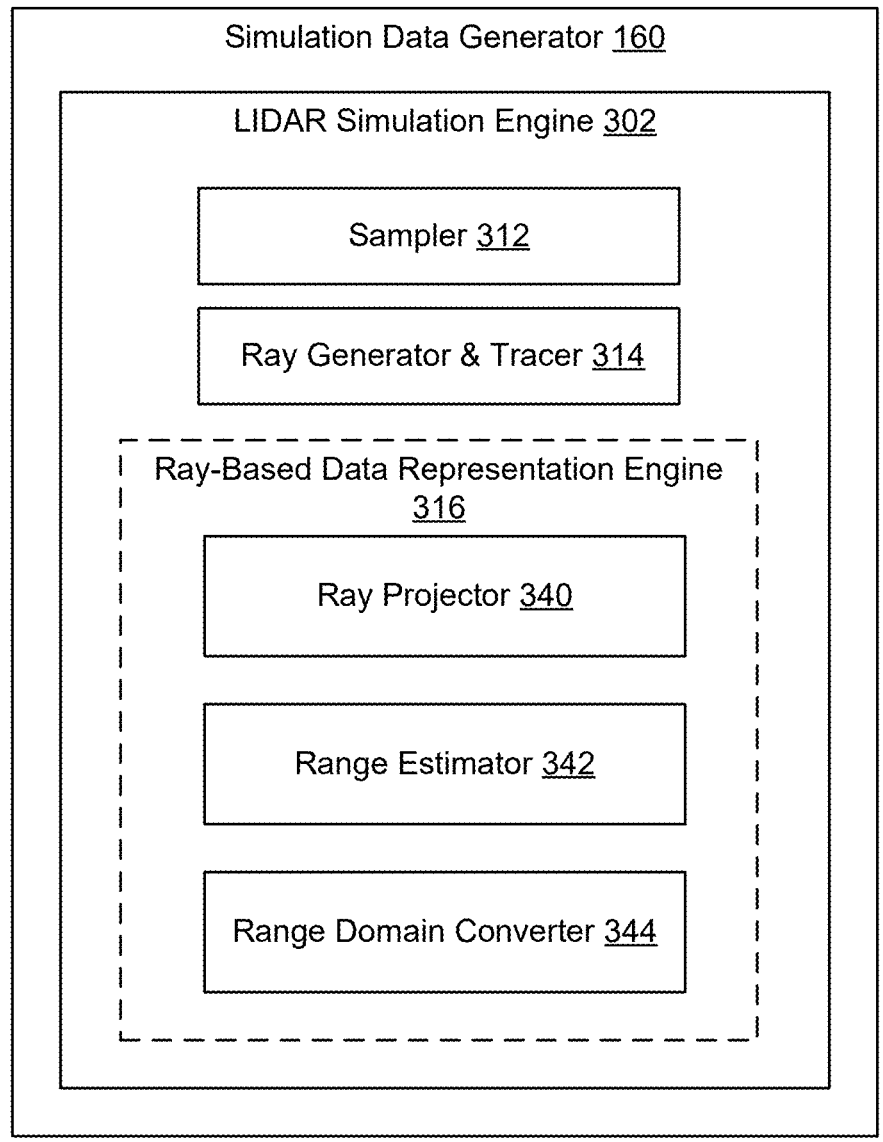

Referring to FIG. 3C, a diagram of the simulation data generator 160 in accordance with some implementations is illustrated. In the illustrated implementation, the simulation data generator 160 includes a LIDAR simulation engine 302. The LIDAR simulation engine 302 includes a sampler 312, a ray generator and tracer 314 and a ray-based data representation engine 316 having a ray projector 340, a range estimator 342, and a range domain converter 344.

The sampler 312 generates a set of sample points on the simulated detector. Now referring also to FIG. 12, in one implementation the sampler 312 determines a disk 1202 centered on the surface plane of the simulated detector 1204 and randomly generates a set of sample points within the boundary of the disk 1202. In one implementation, a dimension of the disk may be based on one or more characteristics of the simulated ranging and detection sensor including, but not limited to, a size of the simulated detector plane, a focus distance of an electromagnetic source (e.g., a laser, in the case of LIDAR), a beam waist (i.e., a beam radius at a focus distance of the electromagnetic source) a Rayleigh length, etc. For example, as illustrated, the disk is circular with a radius equal to the beam waist of the simulated electromagnetic source, which is the laser beam radius at the focal distance in the case of LIDAR.

The ray generator and tracer 314 generates a ray from a sample point on the simulated detector to point in the scene that is intersected by the electromagnetic radiation emitted by a source of the simulated ranging and detection sensor. For example, in some implementations, for each sampled point within 1202, the ray generator and tracer 314 traces a ray to a surface in the scene and returns an associated distance or length of ray. Referring to FIG. 4 a ray length, or distance, from point X to point $X_p$ may be determined as $X_p - X$ in one implementation.

The ray-based data representation engine 316 generates a ray-based data representation. The implementation of the ray-based data representation engine 316 illustrated in FIG. 3C includes a ray projector 340, a range estimator 342, and a range domain converter 344.

In some implementations, the ray projector 340 receives the distance associated with the ray, $z_n$, from the ray generator and tracer 314. The ray projector 340 projects the ray through a response filter across a range of distance, or depth, values to determine the ray's contribution. In some implementations, such as that illustrated in FIG. 12, the distance values across the working range of the simulated detection and ranging sensor (e.g., 0 to 500 meters) are discretized into a plurality (e.g., 2048) bins 1208, and when the ray is projected through the response filter 1206, the ray contributes to more than one bin in a ray-based data representation of intensities across a range of distances as can be seen in representation 1210. In other implementations, the range of distance values may be continuous and not discretized into bins.

The response filter may vary based on implementation. In some implementations the response filter is a continuous function. For example, in one implementation, the response filter is the continuous function is represented by:

$$f(b) = e^{-\sqrt{2}(b-b_0)^2} \qquad \text{Equation 9}$$

where b is measured in bins and $b_0$ is the center bin for a given $z_n$.

By projecting the rays associated with the set of sample points, through the response filter, the ray projector 340 generates a ray-based data representation of intensity over distance. In the discretized implementation illustrated in FIG. 12, the rays generated from the sample points within 1202, when projected through the response filter 1206 by the ray projector 340, generates the histogram 1210 of recovered bin intensities as a ray-based data representation.

In some implementations, the range estimator 342 receives the ray-based data representation of intensity over distance and determines a maximum (e.g., applies a max. operator), and determines an estimated distance, z, detected by the simulated detector is the distance associated with the maximum, or the bin associated with the maximum in the discretized case.

The maximum intensity contributed by a ray in a discretized implementation may vary based on the discretization and the ray distance $z_n$. For example, when z, at, or near, a bin edge, the intensity is divided by the response filter across the adjoining bins to a greater degree than when $z_n$ is at distance centered in a particular bin. Therefore, when plotting the maximum intensity and estimated distance, z, to the target as the target changes distances, the maximum intensity determined by the range estimator 342 may oscillate between a high value (e.g., normalized to 1), when z is centered in a bin, and a low value (e.g., normalized to 0.7), when z coincides with a bin boundary.

In some implementations, the estimated distance, z, to a target is converted into the range bin domain. For example, given the estimated distance to the target, z, the estimated distance is converted to the bin domain as:

$$b(z) = \frac{z - d_{min}}{d_{max} - d_{min}} \cdot (N_b - 1) \quad \text{Equation 10}$$

where $d_{min}$ and $d_{max}$ are the minimum and maximum of the working range of the scanner, respectively, and $N_b$ is the total number of bins. In some implementations, the estimated distance in the bin domain is a ray-based data representation generated by the ray-based data representation engine 316.

Methods

Figure 6:
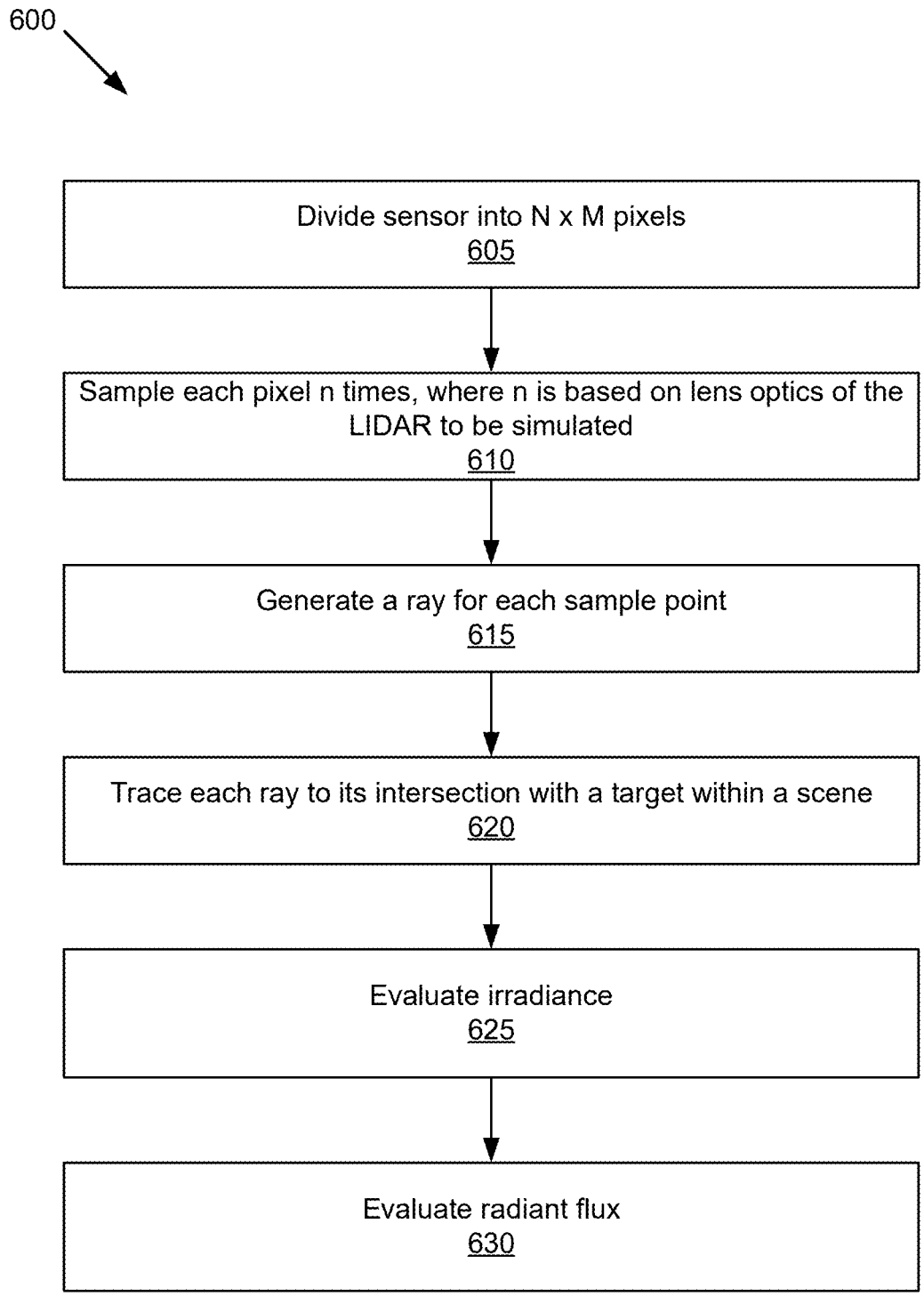
FIG. 6 is a flowchart illustrating a method for generating a beam based or ray-based data representation in accordance with some implementations.

Referring now to FIG. 6, a method 600 for generating a ray-based data representation in accordance with an implementation is illustrated. The method 600 may be a sequence of operations or process steps performed by a computer system (e.g., cloud-based computing system 172 of FIG. 1). At block 605, the detector pixelator 322 divides a sensor into N by M pixels. At block 610, the detector pixel sampler 324 samples each of the N×M pixels, which were determined at block 605, n times, where n is based on lens optics of the LIDAR to be simulated. At block 615, the ray generator and tracer 326 generates a ray for each sample point (e.g., n times M times N rays). At block 620, the ray generator and tracer 326 traces each ray, generated at block 615, to its intersection with a target within a scene. At block 625, the Monte Carlo estimator 336 evaluates an irradiance. At block 630, the Monte Carlo estimator 336 evaluates a radiant flux.

Figure 7:
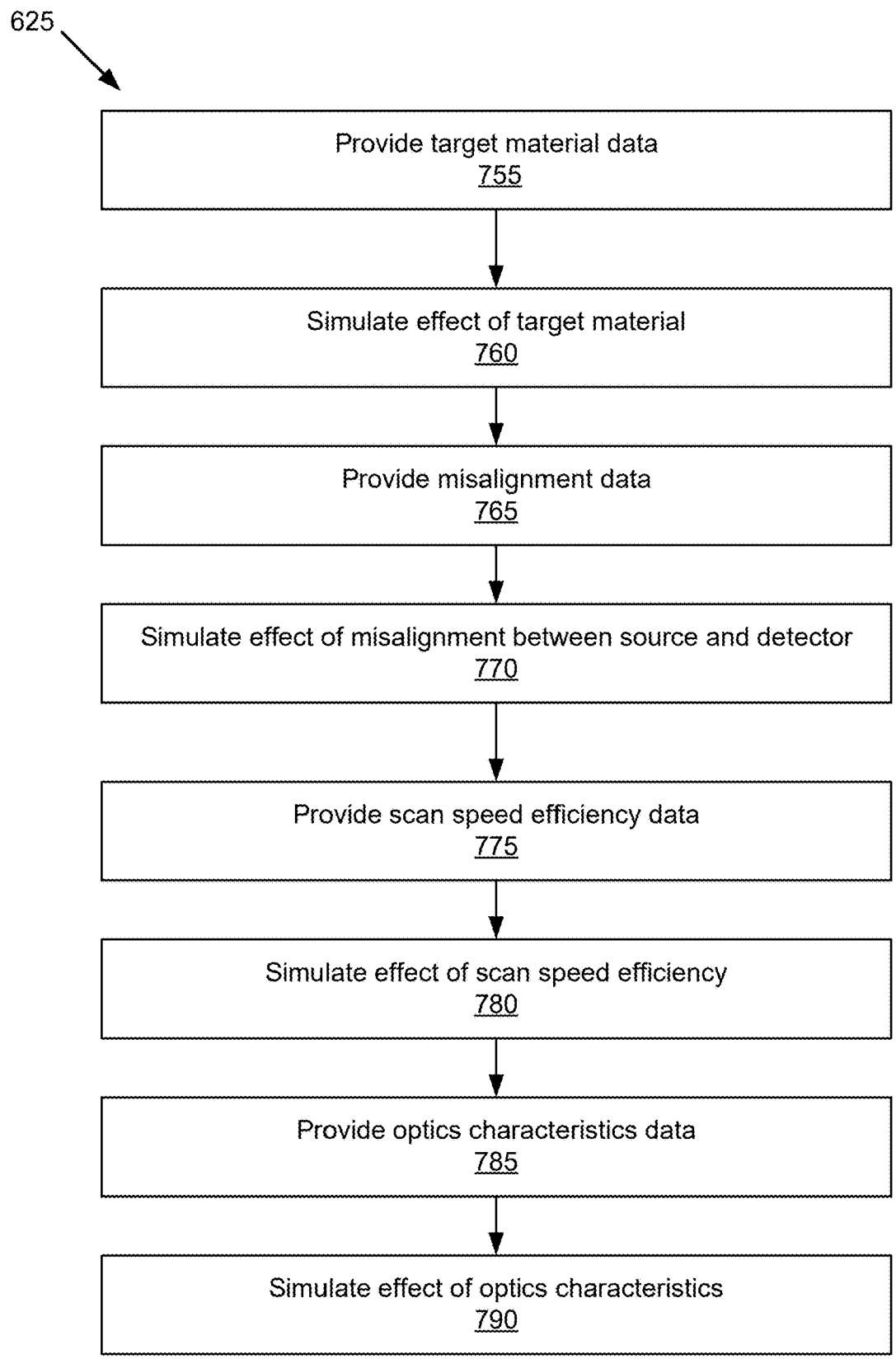
FIG. 7 is a flowchart illustrating a method for evaluating an irradiance in accordance with some implementations.

Referring now to FIG. 7, a method 700 of evaluating an irradiance in accordance with an implementation is illustrated. Furthermore, it should be appreciated that the order of operations in the sequence may be varied, and that some operations may be performed in parallel and/or iteratively in some implementations. Moreover, it should be appreciated that some operations may be omitted in certain implementations. At block 755, the material reflectance simulator 330 provides target material data. At block 760, the Monte Carlo estimator 336 simulates the effect of the target material when evaluating the irradiance. At block 765, the misalignment simulator 334 provides misalignment data. At block 770, the Monte Carlo estimator 336 simulates the effect of a misalignment between the source and the detector. At block 775, the scan speed simulator 332 provides scan speed efficiency data. At block 780, the Monte Carlo estimator 336 simulates an effect of scan speed efficiency. At block 785, the optics simulator 328 provides optics characteristics data. At block 790, Monte Carlo estimator 336 simulates the optics characteristics.

Referring now to FIG. 13, a method 1300 of generating a ray-based data representation in accordance with an implementation is illustrated. The method 1300 may be a sequence of operations or process steps performed by a computer system (e.g., cloud-based computing system 172 of FIG. 1). At block 1305, the sampler 312 determines a first set of sample points on a surface of a simulated detector, the first set of sample points including a first sample point at a first location on the simulated detector and a second sample point at a second location on the simulated detector. At block 1310, the ray generator and tracer 314 generates a first ray associated with the first sample point, where the first ray represents electromagnetic radiation reflected at a first point of intersection within a scene and incident on the first sample point on the surface of the simulated detector. At block 1315, the ray generator and tracer 314 generates a second ray associated with the second sample point, where the second ray represents electromagnetic radiation reflected at a second point of intersection within the scene and incident on the second sample point on the surface of the simulated detector. At block 1320, the ray-based data representation engine 316 generates a ray-based data representation based on the first ray and the second ray.

Figure 14:
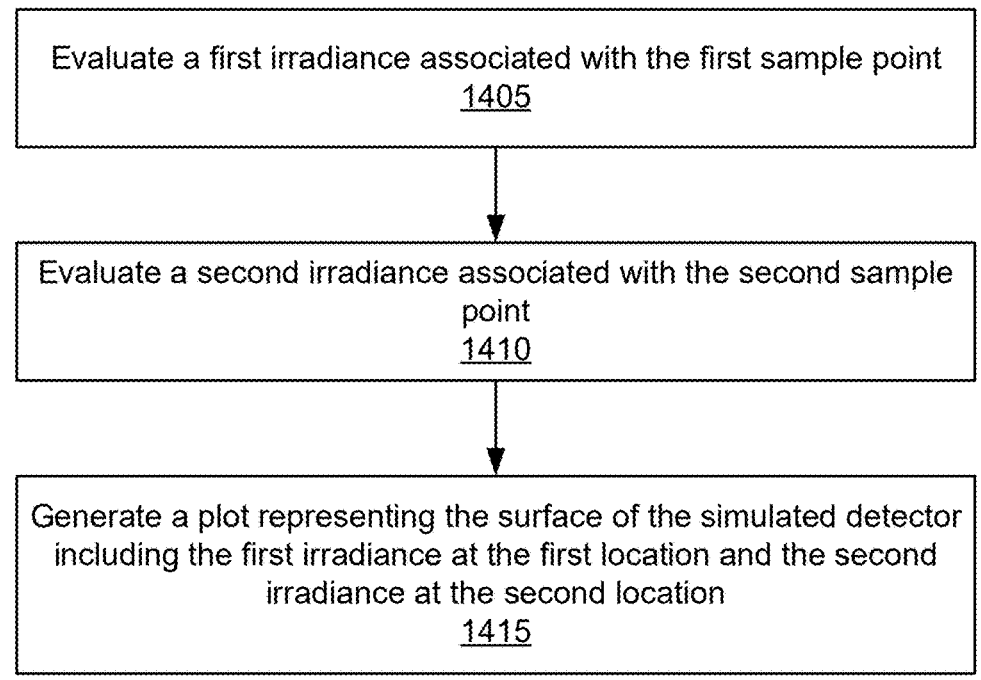
FIG. 14 is a flowchart illustrating method for generating a first ray-based data representation in accordance with some implementations.

Referring now to FIG. 14, a method 1320 of generating a ray-based data representation in accordance with an implementation is illustrated. The method 1320 may be a sequence of operations or process steps performed by a computer system (e.g., cloud-based computing system 172 of FIG. 1). At block 1405, the ray-based data representation engine 316 evaluates a first irradiance associated with the first sample point. At block 1410, the ray-based data representation engine 316 evaluates a second irradiance associated with the second sample point. At block 1415, the ray-based data representation engine 316 generates a plot representing the surface of the simulated detector including the first irradiance at the first location and the second irradiance at the second location.

Figure 15:
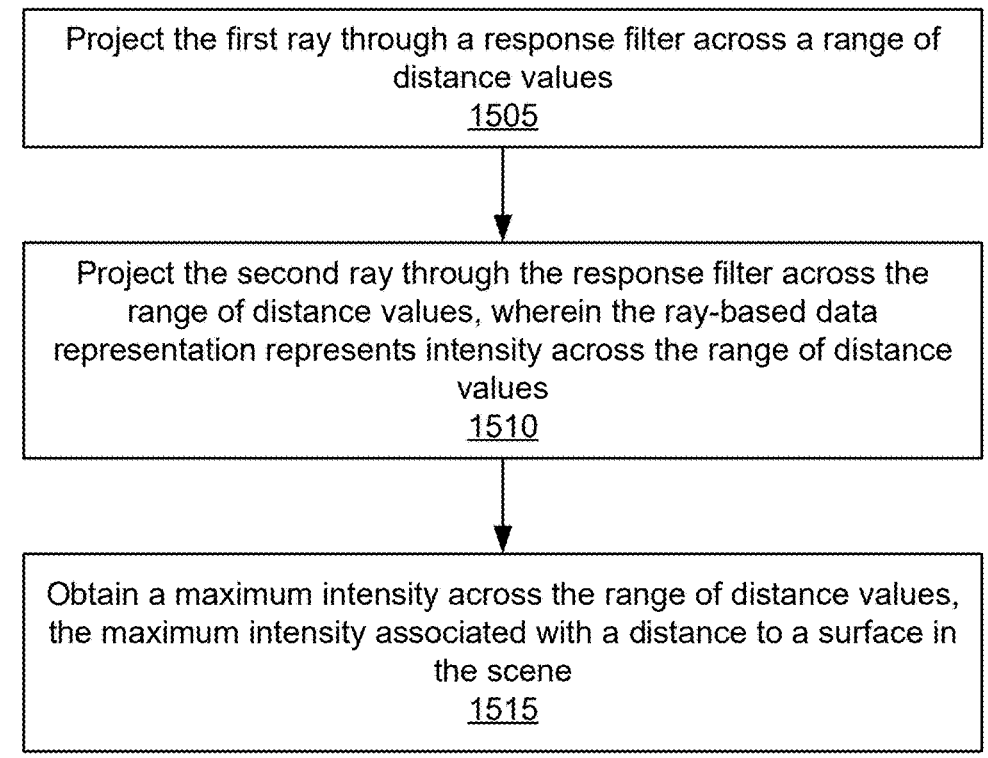
FIG. 15 is a flowchart illustrating a method for generating a second ray-based data representation in accordance with some implementations.

Referring now to FIG. 15, another method 1320 of generating a ray-based data representation in accordance with an implementation is illustrated. The method 1320 may be a sequence of operations or process steps performed by a computer system (e.g., cloud-based computing system 172 of FIG. 1). At block 1505, the ray-based data representation engine 316 projects the first ray through a response filter across a range of distance values. At block 1510, the ray-based data representation engine 316 projects the second ray through the response filter across the range of distance values, wherein the ray-based data representation represents intensity across the range of distance values. At block 1515, the ray-based data representation engine 316 obtains a maximum intensity across the range of distance values, the maximum intensity associated with a distance to a surface in the scene.

Other Considerations

The previous description is provided to enable practice of the various aspects described herein. Various modifications to these aspects should be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations should be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As should be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples should be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method comprising:
   determining, using random sampling, a first set of sample points within a pixel on a surface of a simulated detector, the first set of sample points including a first sample point at a first location on the simulated detector and a second sample point at a second location on the simulated detector;
   generating a trace of a first beam associated with the first sample point, the first beam representing electromagnetic radiation reflected at a first point of intersection and at a first angle with respect to a first target surface having a first level of material reflectance corresponding to a first material at a first distance within a simulated scene and incident on the first sample point on the surface of the simulated detector;

generating a trace of a second beam associated with the second sample point, the second beam representing the electromagnetic radiation reflected at a second point of intersection and at a second angle with respect to a second target surface having a second level of material reflectance corresponding to a second material at a second distance within the simulated scene and incident on the second sample point on the surface of the simulated detector; and generating a beam-based data representation of simulated detection and ranging data received at the simulated detector based on the first beam and the second beam.

2. The method of claim 1, wherein generating the beam-based data representation of simulated detection and ranging data received at the simulated detector comprises:

projecting the first beam through a response filter across a range of distance values;

projecting the second beam through the response filter across the range of distance values, wherein the beam-based data representation represents intensity across the range of distance values; and obtaining a maximum intensity across the range of distance values, the maximum intensity associated with a distance to a surface in the simulated scene.

3. The method of claim 1, wherein generating the beam-based data representation of simulated detection and ranging data received at the simulated detector comprises:

projecting the first beam through a response filter across a first plurality of range bins;

projecting the second beam through the response filter across a second plurality of range bins, wherein a working range associated with the simulated detector is discretized into a third plurality of range bins, and wherein the third plurality of range bins includes the first plurality of range bins and the second plurality of range bins; and obtaining a maximum intensity range bin, the maximum intensity range bin associated with a range of distances and estimating a distance to a surface in the simulated scene.

4. The method of claim 3, further comprising converting the distance to the surface in the simulated scene to a bin domain.

5. The method of claim 1, wherein generating the beam-based data representation of simulated detection and ranging data received at the simulated detector comprises:

evaluating a first irradiance associated with the first sample point;

evaluating a second irradiance associated with the second sample point; and generating a plot representing the surface of the simulated detector including the first irradiance at the first location and the second irradiance at the second location.

6. The method of claim 5, wherein evaluating an irradiance associated with a sample point includes one or more of:

evaluating an effect of a material at a point of intersection in the simulated scene;

evaluating an effect of a misalignment between a source and the simulated detector; and evaluating an effect of a scan speed efficiency; and evaluating an effect of lens optics.

7. The method of claim 1, wherein the first point of intersection is at the first target surface within the simulated scene, and the second point of intersection is at the second target surface within the simulated scene, and wherein generating the beam-based data representation comprises:

evaluating a first irradiance associated with the first sample point;

evaluating a second irradiance associated with the second sample point; and generating a plot representing the surface of the simulated detector including the first irradiance at the first location and the second irradiance at the second location, the plot further representing, based the first irradiance at the first location relative to the second irradiance at the second location, an edge between the first target surface and second target surface.

8. The method of claim 1, wherein determining the first set of sample points on the surface of the simulated detector comprises:

dividing the surface of the simulated detector into a plurality of pixels including a first pixel and a second pixel; and determining the first sample point by sampling the first pixel and determining the second sample point by sampling the second pixel.

9. The method of claim 1, wherein the simulated scene is a virtual scene simulating a real-world scene a vehicle may encounter.

10. The method of claim 1, further comprising:

training a machine learning model based on the beam-based data representation of simulated detection and ranging data received at the simulated detector, the machine learning model automating a task of a vehicle.

11. A system comprising one or more processors and memory operably coupled with the one or more processors, wherein the memory stores instructions that, in response to execution of the instructions by one or more processors, cause the one or more processors to perform operations including:

determining, using random sampling, a first set of sample points within a pixel on a surface of a simulated detector, the first set of sample points including a first sample point at a first location on the simulated detector and a second sample point at a second location on the simulated detector;

generating a trace of a first beam associated with the first sample point, the first beam representing electromagnetic radiation reflected at a first point of intersection and at a first angle with respect to a first target surface having a first level of material reflectance corresponding to a first material at a first distance within a simulated scene and incident on the first sample point on the surface of the simulated detector;

generating a trace of a second beam associated with the second sample point, the second beam representing the electromagnetic radiation reflected at a second point of intersection and at a second angle with respect to a second target surface having a second level of material reflectance corresponding to a second material at a second distance within the simulated scene and incident on the second sample point on the surface of the simulated detector; and generating a beam-based data representation of simulated detection and ranging data received at the simulated detector based on the first beam and the second beam.

12. The system of claim 11, wherein generating the beam-based data representation of simulated detection and ranging data received at the simulated detector comprises:

projecting the first beam through a response filter across a range of distance values;

projecting the second beam through the response filter across the range of distance values, wherein the beam-based data representation represents intensity across the range of distance values; and obtaining a maximum intensity across the range of distance values, the maximum intensity associated with a distance to a surface in the simulated scene.

13. The system of claim 11, wherein generating the beam-based data representation of simulated detection and ranging data received at the simulated detector comprises:

projecting the first beam through a response filter across a first plurality of range bins;

projecting the second beam through the response filter across a second plurality of range bins, wherein a working range associated with the simulated detector is discretized into a third plurality of range bins, and wherein the third plurality of range bins includes the first plurality of range bins and the second plurality of range bins; and obtaining a maximum intensity range bin, the maximum intensity range bin associated with a range of distances and estimating a distance to a surface in the simulated scene.

14. The system of claim 13, further comprising converting the distance to the surface in the simulated scene to a bin domain.

15. The system of claim 11, wherein generating the beam-based data representation of simulated detection and ranging data received at the simulated detector comprises:

evaluating a first irradiance associated with the first sample point;

evaluating a second irradiance associated with the second sample point; and generating a plot representing the surface of the simulated detector including the first irradiance at the first location and the second irradiance at the second location.

16. The system of claim 15, wherein evaluating an irradiance associated with a sample point includes one or more of:

an effect of a material at a point of intersection in the simulated scene;

an effect of a misalignment between a source and the simulated detector; and an effect of a scan speed efficiency; and an effect of lens optics.

17. The system of claim 11, wherein the first point of intersection is at the first target surface within the simulated scene, and the second point of intersection is at the second target surface within the simulated scene, and wherein generating the beam-based data representation comprises:

evaluating a first irradiance associated with the first sample point;

evaluating a second irradiance associated with the second sample point; and generating a plot representing the surface of the simulated detector including the first irradiance at the first location and the second irradiance at the second location, the plot further representing, based the first irradiance at the first location relative to the second irradiance at the second location, an edge between the first target surface and second target surface.

18. The system of claim 11, wherein determining the first set of sample points on the surface of the simulated detector comprises:

dividing the surface of the simulated detector into a plurality of pixels including a first pixel and a second pixel; and determining the first sample point by sampling the first pixel and determining the second sample point by sampling the second pixel.

19. The system of claim 11, wherein the simulated scene is a virtual scene simulating a real-world scene a vehicle may encounter.

20. The system of claim 11, the operations further comprising:

training a machine learning model based on the beam-based data representation of simulated detection and ranging data received at the simulated detector, the machine learning model automating a task of a vehicle.

* * * * *